US008793759B2

(12) United States Patent
Nishizawa et al.

(10) Patent No.: US 8,793,759 B2
(45) Date of Patent: Jul. 29, 2014

(54) AUTHENTICATION COLLABORATION SYSTEM AND ID PROVIDER DEVICE

(71) Applicants: Kabushiki Kaisha Toshiba, Minato-ku (JP); Toshiba Solutions Corporation, Minato-ku (JP)

(72) Inventors: Minoru Nishizawa, Tokyo (JP); Tatsuro Ikeda, Tokyo (JP); Masataka Yamada, Tokyo (JP); Yuuichirou Esaki, Tokyo (JP); Seiichiro Tanaka, Saitama-ken (JP)

(73) Assignees: Kabushiki Kaisha Toshiba, Minato-ku (JP); Toshiba Solutions Corporation, Minato-ku (JP)

( * ) Notice: Subject to any disclaimer, the term of this patent is extended or adjusted under 35 U.S.C. 154(b) by 0 days.

(21) Appl. No.: 13/785,746

(22) Filed: Mar. 5, 2013

(65) Prior Publication Data

US 2013/0198801 A1      Aug. 1, 2013

Related U.S. Application Data

(63) Continuation of application No. PCT/JP2012/006085, filed on Sep. 25, 2012.

(30) Foreign Application Priority Data

Dec. 27, 2011   (JP) ................................. 2011-287021

(51) Int. Cl.
*H04L 29/06* (2006.01)
*G06F 21/41* (2013.01)

(52) U.S. Cl.
CPC ............ *H04L 63/0815* (2013.01); *H04L 63/20* (2013.01); *H04L 29/06768* (2013.01); *G06F 21/41* (2013.01)
USPC .................................................. 726/1; 726/8

(58) Field of Classification Search
CPC ................ H04L 63/0815; H04L 63/20; H04L 29/06768; G06F 21/41
USPC ........................................................... 726/1, 8
See application file for complete search history.

(56) References Cited

U.S. PATENT DOCUMENTS

| 6,243,816 | B1 * | 6/2001 | Fang et al. ........................ 726/5 |
| 7,617,523 | B2 * | 11/2009 | Das et al. .......................... 726/5 |
| 2005/0204041 | A1 * | 9/2005 | Blinn et al. .................... 709/225 |
| 2009/0150968 | A1 * | 6/2009 | Ozzie et al. ........................ 726/1 |
| 2010/0024015 | A1 * | 1/2010 | Hardt ................................. 726/6 |
| 2012/0254935 | A1 * | 10/2012 | Yato et al. ......................... 726/1 |
| 2012/0254942 | A1 * | 10/2012 | Hayashi et al. .................... 726/3 |

FOREIGN PATENT DOCUMENTS

| JP | 2007-323340 | 12/2007 |
| JP | 2008-538247 | 10/2008 |

(Continued)

*Primary Examiner* — Michael Pyzocha
(74) *Attorney, Agent, or Firm* — Oblon, Spivak, McClelland, Maier & Neustadt, L.L.P.

(57) ABSTRACT

An ID provider device according to an embodiment includes a policy information storage unit that stores policy information representing a user of a target to whom transmission of service data is permitted, an authentication collaboration request preliminary processing unit that performs a policy evaluation process and an account collaboration process at a timing according to a log-in status of a user terminal when an authentication collaboration request is received, and an authentication collaboration request transfer unit that transfers the authentication collaboration request to the authentication collaboration request preliminary processing unit when the authentication collaboration request is received from the service provider device.

5 Claims, 26 Drawing Sheets

(56) References Cited

FOREIGN PATENT DOCUMENTS

| | | |
|---|---|---|
| JP | 2010-282362 | 12/2010 |
| JP | 2011-59943 | 3/2011 |
| JP | 2011-253450 | 12/2011 |
| JP | 2012-103846 | 5/2012 |

* cited by examiner

| No | Internet public URL | | Transfer destination URL | |
|---|---|---|---|---|
| | ID | URL | ID | URL |
| 1 | 1-A | Authentication collaboration request message receiving unit URL of IDP authentication collaborating unit | 1-B | Authentication collaboration request message preliminary processing unit URL of authentication collaboration control system |
| | 1-C | Dummy (1) URL | 1-D | Authentication collaboration request message receiving unit URL of IDP authentication collaborating unit<br>※ ID = same URL as 1-A |
| 2 | 2-A | Authentication collaboration response issue request message receiving unit URL of IDP authentication collaborating unit | 2-B | Authentication collaboration response issue request message preliminary processing unit URL of authentication collaboration control system |
| | 2-C | Dummy (2) URL | 2-D | Authentication collaboration response issue request message receiving unit URL of IDP authentication collaborating unit<br>※ ID = same URL as 2-A |
| 3 | 3-A | Log-in response message receiving unit URL of IDP authentication collaborating unit | 3-B | Log-in response message preliminary processing unit URL of authentication collaboration control system |
| | 3-C | Dummy (3) URL | 3-D | Log-in response message receiving unit URL of IDP authentication collaborating unit<br>※ ID = same URL as 3-A |

| Item name of user attribute | Item value of user attribute |
|---|---|
| User ID | user_0001 |
| name | xxxxxx |
| Employee no. | 20100030 |
| Department | X department |
| Division | Y division |
| Appointment | Z appointment |
| ... | ... |
| Address information | user_0001@OOO.co.jp |
| Reference information | pass12word34 |
| Phone number | xx-xxxx-xxxx |

IDP user store

FIG.4

AUTHENTICATION COLLABORATION SYSTEM AND ID PROVIDER DEVICE

CROSS-REFERENCE TO RELATED APPLICATIONS

This application is a Continuation of PCT International Application No. PCT/JP2012/006085, filed Sep. 25, 2012 and which claims the benefit of priority from Japanese Patent Application No. 2011-287021, filed Dec. 27, 2011, the entire contents of both which are incorporated herein by reference.

FIELD

Embodiments of the present invention relate to an authentication collaboration system and an ID provider device.

BACKGROUND

There is a single sign-on (hereinafter, referred to as an "SSO") as a technique of performing authentication collaboration capable of using a plurality of applications or services by a single authentication procedure. In the SSO, there are many cases in which authentications included in a plurality of applications are integrated in a single domain such as the Intranet of one company.

However, in recent years, the SSO is required between different domains (which means 'between different WWW servers', and hereinafter referred to as a "cross domain"). The reasons may include an increase in corporate marriage or merge, overseas development, and the like, and an outsourcing by software as a service (SaaS) of raised cloud computing or the like.

However, in implementing the cross domain SSO, there is a problem in that a great deal of time and effort are required to share an authentication result. The main problems are the following two points.

A first problem lies in that since a use of an HTTP cookie is limited to a single domain, it is difficult to share an authentication result between domains using an HTTP cookie. A second problem lies in that since an SSO scheme of an access management product employed by each domain differs according to a vender, it is difficult to simply introduce, and it is necessary to prepare a separate measure.

In order to solve the above problems, there is a demand for standardization of an SSO. As one of representative standard techniques to comply with a request, there is a security assertion markup language (SAML) made by an organization for the advancement of structured information standards (OASIS) which is a non-profitable organization.

The SAML is a specification that defines an expression form of information related to an authentication, an authorization, and an attribute and transmission and reception procedures, and is systematically specified so that an implementation can be made in various forms according to the purpose. Main entities include three of an identity provider (hereinafter, referred to as an "IDP" or "ID provider"), a service provider (hereinafter, referred to as an "SP" or "service provider"), and a user and the SSO is implemented such that the service provider trusts in an authentication result issued by the ID provider.

When the user starts the SSO based on the SAML, it is generally necessary to prepare the following two points in advance. Firstly, a relation of trust needs to be constructed through information exchange or an agreement in a business or a technology between the service provider and the ID provider. Secondly, each user has an individual account for each service provider, and thus the individual SP account needs to collaborate with an account of the ID provider in advance (hereinafter, referred to as "account collaboration"). In a state in which advance preparation such as construction of the relation of trust and prior account collaboration is not finished, it is difficult for the user to start the SSO.

After the advance preparation, the SSO is implemented by the following procedures (1) to (6). Here, an SSO procedure of a service provider start model using a user terminal will be described.

(1) The user requests the service provider to provide a service.

(2) The service provider transmits an authentication request to the ID provider through a user side terminal since the user is not authenticated yet.

(3) The ID provider performs authentication on the user by a certain procedure, and generates an authentication assertion. The SAML does not specify an authentication means, and specifies only a system in which the authentication assertion is transmitted to the service provider. The authentication assertion includes information representing a way of generating the type of authentication means or a credential since the service provider determines whether or not the service provider can trust in an authentication result.

(4) The ID provider transmits the authentication result including the generated authentication assertion to the service provider through the user terminal.

(5) The service provider decides whether or not a service is to be provided based on the authentication result of the ID provider.

(6) The user is provided with a service from the service provider.

Further, in connection with the origination point from which the user makes an SSO request, in the SAML, two models, that is, a service provider start model (hereinafter, referred to as an "SP start model") and an ID provider start model (hereinafter, referred to as an "IDP start model") are defined. The SP start model follows the SSO procedure, and is a model in which an SSP request starts when the user accesses the SP, and the SP transmits an authentication request based on the SAML.

The IDP start model is a model in which the process starts when the user terminal requests the ID provider to provide the service of the service provider in the SSO procedure (1). Thus, the process of (3) to (6) is performed subsequently to the procedure (1) without performing the SSO procedure (2).

As described above, in the SSO based on the SAML, as the ID provider performs a single authentication procedure, the user can use a plurality of services without an additional authentication procedure.

However, the SSO based on the SAML is mere a part such as "use" of identity in an overall life cycle of an identity. As described above, when the SSO starts, it is necessary to perform account collaboration, and in order to perform account collaboration, a technique of comprehensively collaborating management such as registration, change, deletion, reissue, and temporary suspension of an identity between the service provider and the ID provider is required.

As a technique for automating registration, change, deletion, reissue, and temporary suspension of an identity, there is account provisioning, and as a standard technique thereof, there is a service provisioning markup language (SPML).

Meanwhile, there has been known a data processing system that actively executes account collaboration as a part of the SSO in a state in which the advance preparation of the account collaboration is not finished. Typically, when the SSO starts in a state in which the user's account is not registered to the service provider side, that is, in a state in which account collaboration is not performed, an error occurs.

However, according to this data processing system, the account collaboration can be actively executed as a part of the SSO even in the above-described state. Specifically, after the service provider receives a service request from the user, the service provider checks that information sufficient register the user's account is not held. After checking, the service provider requests the ID provider to provide a user attribute, and the ID provider provides the service provider with a desired user attribute. As a result, the data processing system executes account registration and collaboration in the process of the SSO.

However, for example, when a predetermined user uses the SaaS in a company, a management department needs to collectively perform prior account registration and account collaboration on the service provider. Alternatively, a service provider use request procedure is performed through a series of authorization flow by each user at an arbitrary timing, and then a management department performs prior account registration and collaboration related to the user who made the request on the service provider. After the preliminary process is performed, the user can use the service provided by the service provider.

Here, when the preliminary process of the former is performed, since account registration and collaboration need not be executed in the process of the SSO, it is not related to the above-described data processing system. Meanwhile, when the authorization flow of the latter is performed, a great deal of time and effort are required since a lot of manpower is necessary such as seniors and a management department of an organizational to which the user belongs as well as the user. In addition, since the management department does not collectively perform account registration and collaboration, a manual work is necessary, and a burden is great. Thus, efficiency and convenience are bad.

In the SaaS or the like, there is an advantage that it can be used when desired. However, in the case of the authorization flow of the latter, a manual work occurs, and a burden is great, and thus it is difficult to have the advantage. For this reason, in a system in which account registration and collaboration are executed in the process of the SSO, it is desirable to include a seamless system capable of deciding whether or not a service can be used without involving a manual operation.

However, in order to implement this system, it is necessary to modify the ID provider having the SAML function, and the introduction cost is high.

In order to achieve the object of the present invention, there is provided an authentication collaboration system and an ID provider device, which are easy to introduce since the ID provider device needs not be modified and can decide whether or not a service can be used without a manual operation when account registration and collaboration are executed in the process of the SSO.

BRIEF DESCRIPTION OF DRAWINGS

FIG. 2 is a diagram illustrating an example of a transfer destination URL management table of an ID provider device according to the first embodiment.

FIG. 4 is a diagram illustrating an example of an IDP user store of the ID provider device according to the first embodiment.

DESCRIPTION OF EMBODIMENTS

An ID provider device according to an embodiment includes a policy information storage unit that stores policy information representing a user of a target to whom transmission of service data is permitted, an authentication collaboration request preliminary processing unit that performs a policy evaluation process and an account collaboration process at a timing according to a log-in status of a user terminal when an authentication collaboration request is received, and an authentication collaboration request transfer unit that transfers the authentication collaboration request to the authentication collaboration request preliminary processing unit when the authentication collaboration request is received from the service provider device.

Hereinafter, an authentication collaboration system according to embodiments of the present invention will be described with reference to the accompanying drawings.

First Embodiment

Hereinafter, an authentication collaboration system of the present embodiment will be described with reference to FIGS. 1 to 15.

Figure 1:
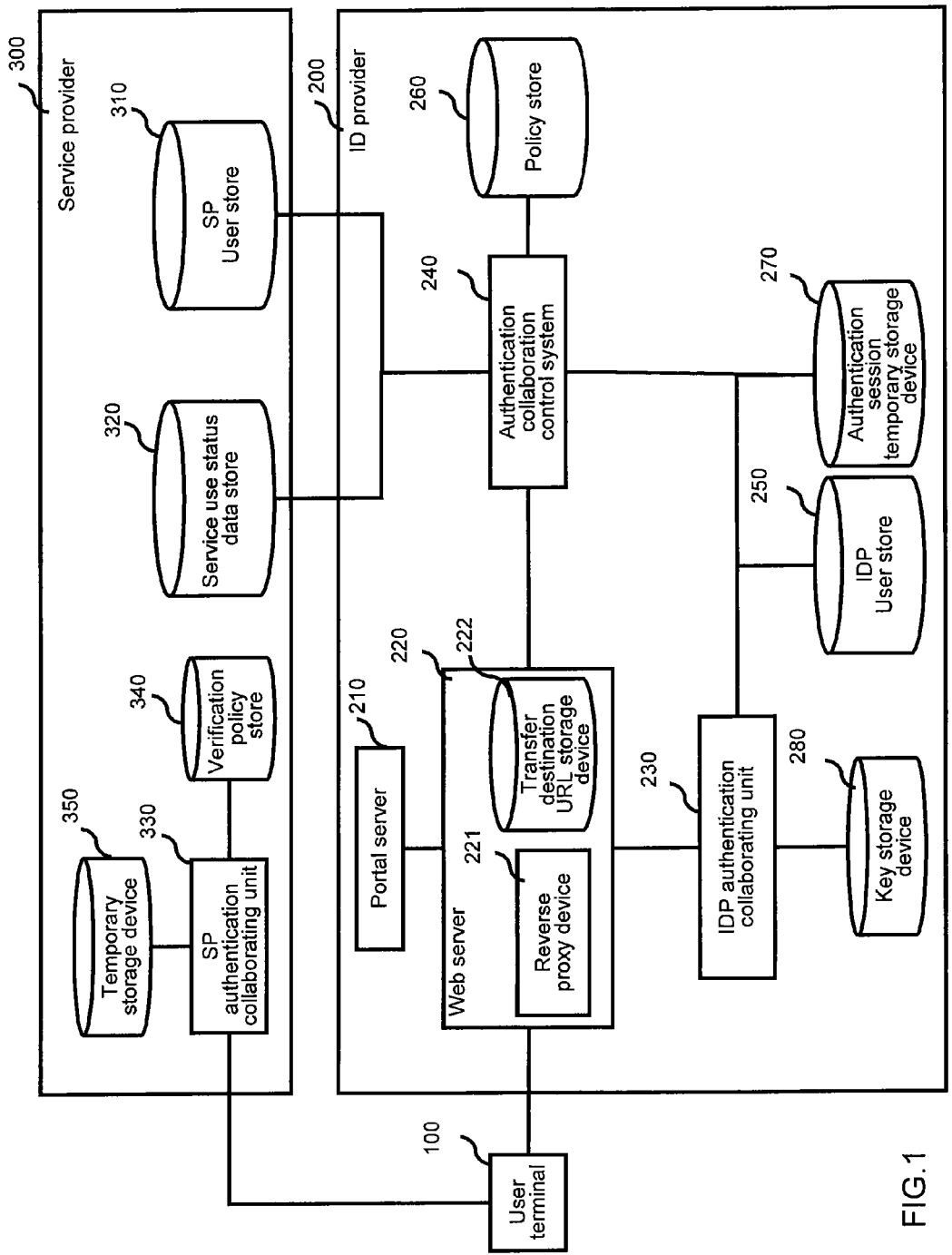
FIG. 1 is a block diagram illustrating an example of a hardware configuration of an authentication collaboration system according to a first embodiment.

FIG. 1 is a block diagram illustrating a basic configuration of an authentication collaboration system according to the present embodiment. The authentication collaboration system includes an ID provider device 200 capable of executing a log-in process on a user terminal 100 operated by the user and a service provider device 300 capable of transmitting service data to the user terminal 100 when the log-in process is successfully performed. As the service provider device 300, a plurality of devices may be provided, but only one device is here illustrated. The user terminal 100, the ID provider device 200, and the service provider device 300 may be connected to one another via a network.

The user terminal 100 is a device that has a typical computer function and can communicate with the ID provider device 200 and the service provider device 300, and includes a function of transmitting an SP use request for requesting a use of the service provider device 300 to the service provider device 300 in response to the user's operation, a function of executing the log-in process between the user terminal 100 and the ID provider device 200, a function of receiving service data from the service provider device 300, a function of reproducing the received service data as a central processing unit (CPU) executes a service use application program stored in a memory in advance, and a user interface function.

The ID provider device 200 performs a log-in process, that is, authentication of a user who uses a service provided by the service provider device 300. Further, the ID provider device 200 performs user account registration to the service provider and account collaboration based on policy information which will be described below.

The ID provider device 200 includes a portal server 210, a web server 220, an IDP authentication collaborating unit 230, an authentication collaboration control system 240, an IDP user store 250, a policy store 260, an authentication session temporary storage device (first memory) 270, and a key storage device 280.

The portal server 210 displays a service provider of an access destination to the user.

The web server 220 includes a reverse proxy device (a first message transfer unit) 221 and a transfer destination URL storage device 222, and receives a message from the user terminal 100.

In other words, when the web server 220 receives the message, the reverse proxy device 221 transfers the received message with reference to the transfer destination URL storage device 222.

FIG. 2 is an example of a transfer destination URL management table 223 stored in the transfer destination URL storage device 222. As illustrated in FIG. 2, in the transfer destination URL management table 223 according to the present embodiment, an Internet open URL and a transfer destination URL are stored to be associated with each other, and an ID is assigned to each of the Internet open URL and the transfer destination URL. In other words, the reverse proxy device 221 searches for the Internet open URL corresponding to a message received from the user terminal 100 by a web server 220, and transfers the message to a transfer destination URL corresponding to the search result.

The IDP authentication collaborating unit 230 has an ID provider function of an SSO. Here, an example of a configuration of the IDP authentication collaborating unit 230 will be described with reference to FIG. 3.

Figure 3:
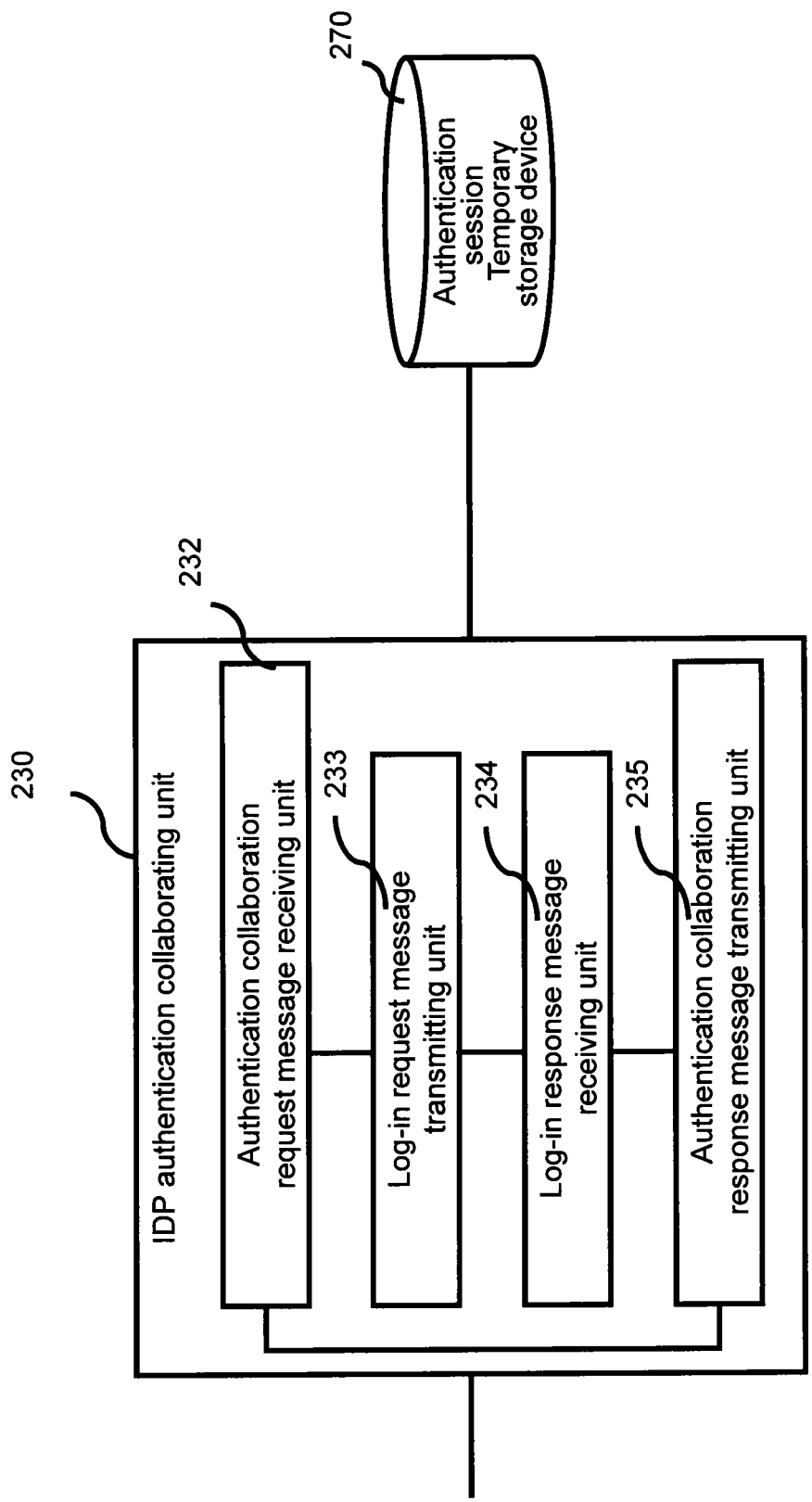
FIG. 3 is a block diagram illustrating an example of a functional configuration of an IDP authentication collaborating unit of the ID provider device according to the first embodiment.

As illustrated in FIG. 3, the IDP authentication collaborating unit 230 of the ID provider device 200 according to the present embodiment includes an authentication collaboration request message receiving unit 232, a log-in request message transmitting unit 233, a log-in response message receiving unit 234, and an authentication collaboration response message transmitting unit 235.

The authentication collaboration request message receiving unit 232 receives an authentication collaboration request message from an SP authentication collaborating unit 330 of the service provider device 300 which will be described below. For example, the authentication collaboration request message has an HTTP request form, and is a message issued in order to request the ID provider device 200 to perform authentication collaboration when the service provider device 300 receives the service use request from the user terminal 100. Further, the authentication collaboration request message receiving unit 232 checks the log-in status of the user terminal, and requests the authentication collaboration response message transmitting unit 235 (which will be described below) to generate an authentication collaboration response message representing that the user has been authenticated when the log-in status is a log-in completion status.

The log-in request message transmitting unit 233 transmits the log-in request message to the user terminal 100 which is in a log-in non-completion status.

The log-in response message receiving unit 234 receives a log-in response message input by the user terminal 100 as response information to the log-in request message, and performs the log-in process of the user.

Specifically, upon receiving the log-in response message including the user ID and the user authentication information as the response information to the log-in request message from the user terminal 100, the log-in response message receiving unit 234 is a process of performing authentication based on a user ID in an ID provider user store 250 (hereinafter, referred to as an "IDP user store 250") and reference information. Here, the IDP user store 250 will be described with reference to FIG. 4.

The IDP user store 250 stores attribute information (hereinafter, referred to as "user attribute information") related to the user belonging to the ID provider device 200.

As illustrated in FIG. 4, the IDP user store 250 stores user attribute information 251 in which an item name of a user attribute specifying the user is associated with an item value of the user attribute. For example, the user attribute information 251 includes a user ID identifying the user, a user name, the user's employee number, a department to which the user belongs, a division to which the user belongs, the user's appointment, address information of the user terminal, reference information referred to when the log-in process of the user is performed, and the user's phone number as item names. A plurality of pieces of user attribute information 251 are stored in the IDP user store 250, and an example thereof is illustrated in FIG. 4.

In other words, the user attribute information 251 is collection of information characterizing information of an individual. The user attribute information 251 is not limited to this example, and may further include an arbitrary item name such as a working state and an item value, for example. In the present embodiment, a password is used as the reference information referred to when the log-in process of the user is performed, but the reference information is not limited to this example and may be biometric authentication information such as the user's fingerprint, for example.

When an authentication collaboration response message generation request is received from the authentication collaboration request message receiving unit 232, the authentication collaboration response message transmitting unit 235 generates an authentication collaboration response message including authentication assertion representing that the user has been authenticated by the ID provider device 200. The authentication assertion includes information representing a way of generating the type of an authentication means or a credential so the service provider device 300 determines whether or not an authentication result is reliable.

Figure 5:
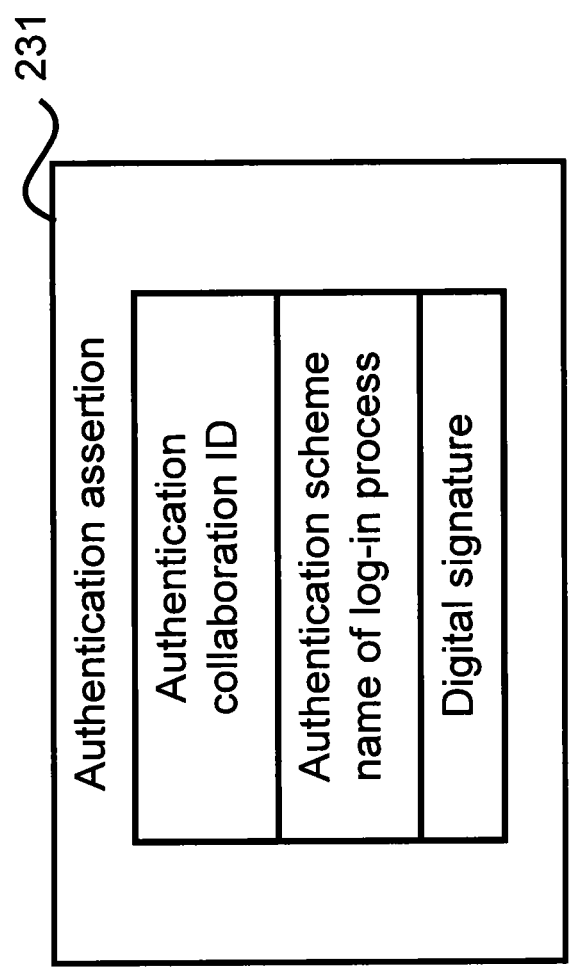
FIG. 5 is a diagram illustrating an example of an authentication assertion of the ID provider device according to the first embodiment.

Here, FIG. 5 illustrates an example of an authentication assertion 231 generated by the IDP authentication collaborating unit 230 according to the present embodiment.

As illustrated in FIG. 5 the authentication assertion 231 includes an authentication collaboration ID, an assertion context including an authentication scheme name of the log-in process, and a digital signature. The authentication collaboration ID is an ID for connecting each user ID (the user ID and the SP side user ID) at both of the ID provider device 200 and the service provider device 300, and is issued by an account provisioning unit 247 which will be described below. For example, as the authentication collaboration ID, a new ID may be issued, the user ID of the ID provider device 200 may be designated, or a mail address which is the common user attribute information 251 between the ID provider device 200 and the service provider device 300 may be designated. Further, the authentication collaboration ID is used for the service provider device 300 to identify the user who has made a use request in an authentication collaboration response checking process which will be described below. The digital signature is generated based on the signature generation key in the key storage device 280 on the assertion context through the IDP authentication collaborating unit 230.

The key storage device 280 stores the signature generation key of the ID provider device 200. As the signature generation key, for example, of a pair of the public key and the secret key in the public key cryptosystem, the secrete key may be used.

Further, the authentication collaboration response message transmitting unit 235 transmits the generated authentication collaboration response message to the SP authentication collaborating unit 330.

Next, an example of a configuration of the authentication collaboration control system 240 will be described with reference to FIG. 6.

Figure 6:
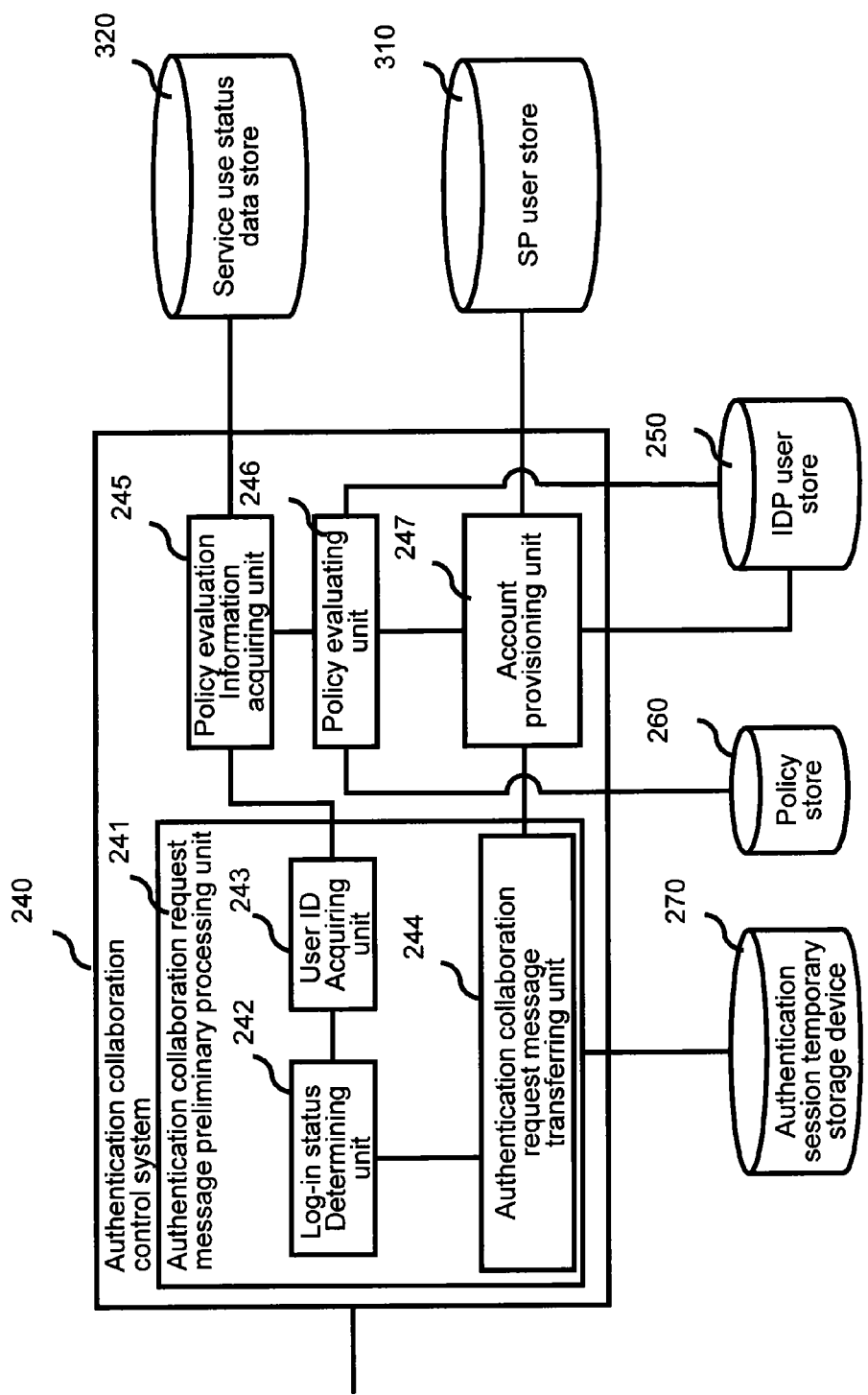
FIG. 6 is a block diagram illustrating an example of a functional configuration of an authentication collaboration control system of the ID provider device according to the first embodiment.

As illustrated in FIG. 6, the authentication collaboration control system 240 includes an authentication collaboration request message preliminary processing unit 241, a policy evaluation information acquiring unit 245, a policy evaluating unit 246, and an account provisioning unit 247.

The authentication collaboration request message preliminary processing unit 241 includes a log-in status determining unit 242, a user ID acquiring unit 243, and an authentication collaboration request message transferring unit (a second message transferring unit) 244, and performs a preliminary process when the ID provider device 200 receives the authentication collaboration request message from the user terminal 100. The preliminary process will be described below.

The log-in status determining unit 242 determines the log-in status with reference to an IDP authentication token stored in a cookie included in an HTTP request when the authentication collaboration request message having, for example, an HTTP request form is received from the user terminal 100. The IDP authentication token is issued by the ID provider device 200 when the log-in process which will be described below is performed. In other words, when the IDP authentication token is included in a cookie in the HTTP request, the user is in the log-in completion status in the ID provider device 200. The user ID representing the user to whom the IDP authentication token is issued is also included in the cookie.

Figure 7:
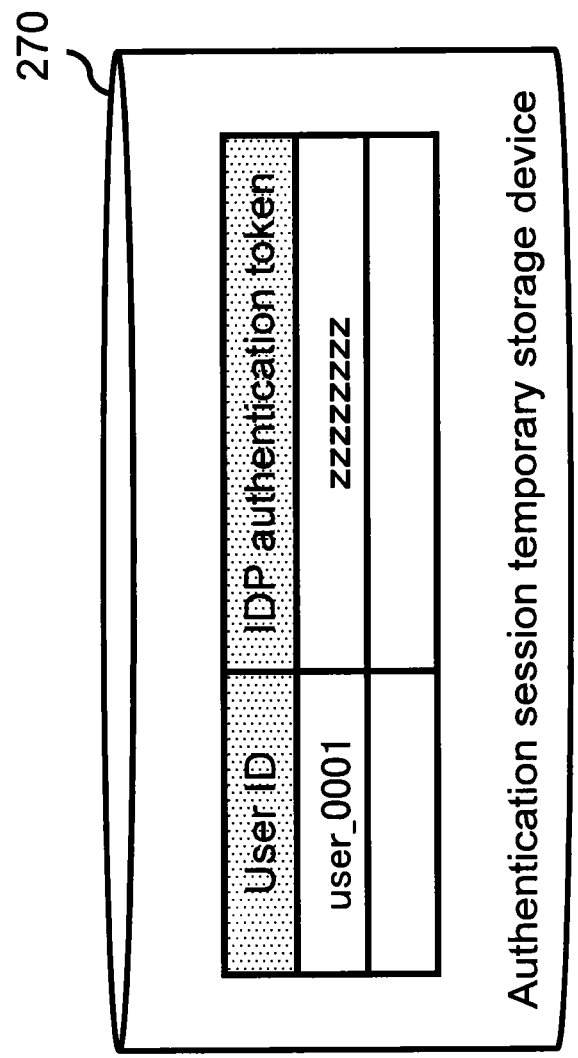
FIG. 7 is a block diagram illustrating an example of an authentication session temporary storage device of the ID provider device according to the first embodiment.

For example, the cookie is stored in a memory such as a RAM included in the ID provider device. Hereinafter, a memory storing a cookie is referred to as an "authentication session temporary storage device 270." FIG. 7 illustrates an example of the authentication session temporary storage device 270.

When the log-in status determining unit 242 determines that the log-in status is the log-in completion status, the user ID acquiring unit 243 acquires the user ID corresponding to the IDP authentication token from the authentication collaboration request message.

The authentication collaboration request message transferring unit 244 transfers the authentication collaboration request message to a URL which is not present in the ID provider device 200 (hereinafter, referred to as a "dummy URL"). A dummy URL of a transfer destination is set in advance, and is here referred to as a dummy (1) URL.

The policy evaluation information acquiring unit 245 acquires policy evaluation information from the IDP user store 250 and a service use status data store 320 which will be described below. The policy evaluation information refers to information including the user attribute information 251 stored in the IDP user store 250 and service use status information 321 to 324 of the user stored in an SP service store 320 which will be described below.

The policy evaluating unit 246 determines whether or not the user can use the service provider 300 based on the policy evaluation information acquired by the policy evaluation information acquiring unit 245 and the policy information managed by the policy store 260.

Figure 8:
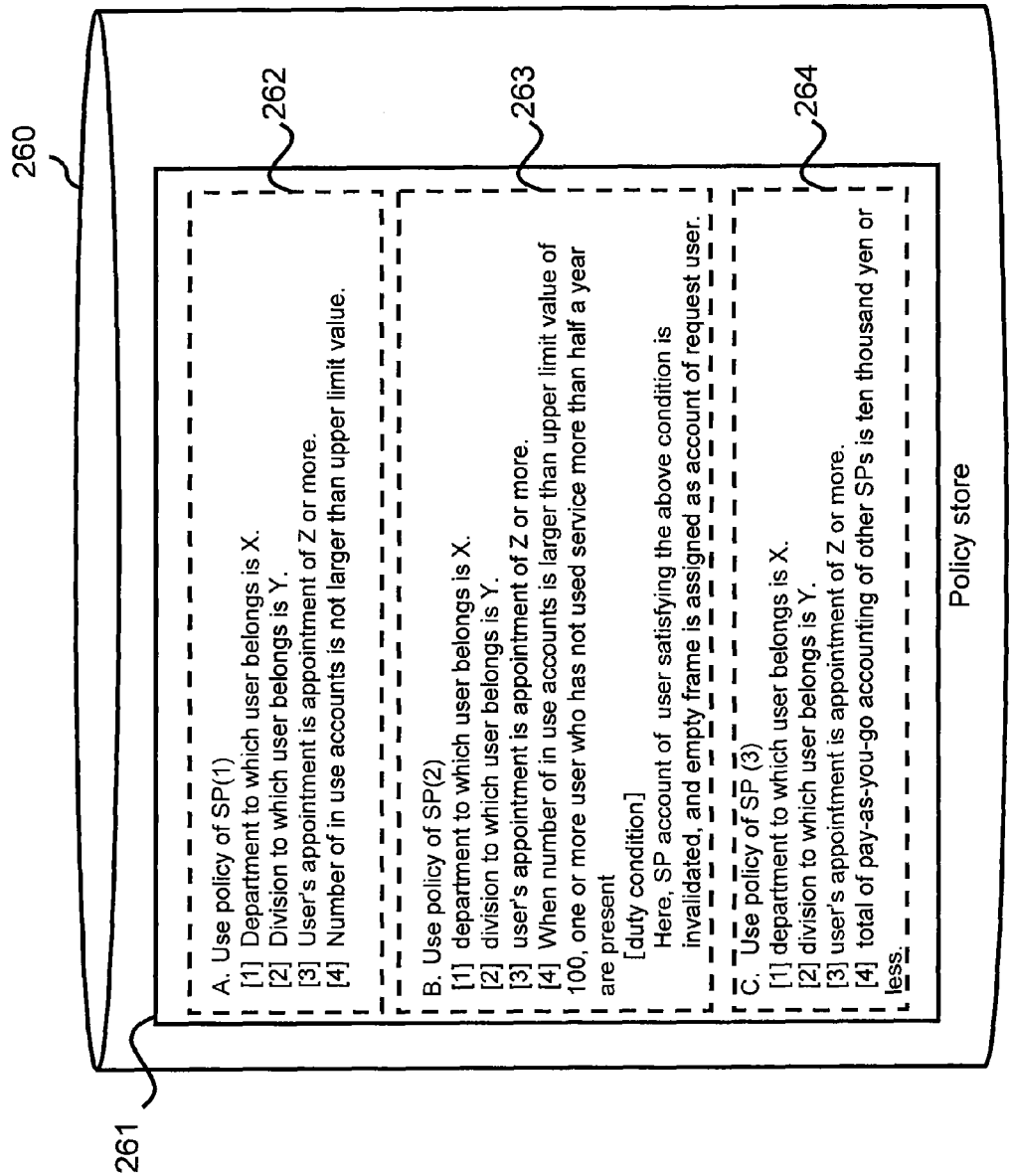
FIG. 8 is a diagram illustrating an example of a policy store of the ID provider device according to the first embodiment.

The policy store 260 according to the present embodiment stores a plurality of pieces of policy information representing the users who are targets to which communication is to be permitted. FIG. 8 illustrates an example of the policy store 260.

As illustrated in FIG. 8, the policy store 260 stores a plurality of authentication collaboration policies (hereinafter, referred to as "policy information") 261 (262, 263, 264, and the like) representing affiliations and appointments of the users to whom transmission of service data by the service provider device 300 identified by the service provider ID is to be permitted for each service provider ID.

The policy store 260 may further include an active policy (for example, [4] of C in FIG. 8) such as the number of in-use services and a total of pay-as-you-go accounting in addition to a static policy (for example, [1] to [3] of A to C in FIG. 8) such as the user's affiliation and appointment.

For example, in elements of the above-described policy, a "subject" corresponds to a name, an appointment, an affiliation, or the like, a "resource" corresponds to the service provider ID, an URL, or the like, an "action" corresponds to a use start, a use restart, or the like, and an "environmental condition" corresponds to an IP address of the user who makes a certain request, an accessible period of time or time, or the like. Further, a "duty condition" is a work assigned when a policy (accessibility condition) evaluation result is received, and authentication collaboration is performed. For example, it is an instruction "a request for "registering a new user" is permitted, but "ID of idle user is deleted" has to be reliably executed" (for example, "duty condition" of [4] of B in FIG. 8).

The account provisioning unit 247 acquires the user attribute information 251 from the IDP user store 250 based on the determination result of the policy evaluating unit 246 on whether or not the user can use the service provider, and performs account registration on an SP user store 310 using the acquired user attribute information 251. In other words, the account provisioning unit 247 issues the authentication collaboration ID. Further, the account provisioning unit 247 performs account collaboration on both of the IDP user store 250 and the SP user store 310.

Through the above-described configuration, the authentication collaboration control system 240 performs the account registration process and the account collaboration process (which will be described later) based on the policy information at a log-in timing performed when the user requests the SSO or when the SSO process is being performed.

Here, the policy information refers to collection of the conditions, on whether or not the user can use the service provider, in which it is defined whether or not who (the user or the like) can perform which operation (action) to which service provider device. In other words, the policy information represents the user who is the target to which transmission of service data in the service provider device 300 is to be permitted. Further, there is policy information which is defined even on an environmental condition or a duty condition as an option.

Meanwhile, the service provider device 300 provides a service to be used by the user. The service provider device 300 includes a service provider (hereinafter, referred to as an "SP") user store 310, a service use status data store 320, an SP authentication collaborating unit 330, a verification policy store 340, and a temporary storage device (a second memory) 350.

The SP user store 310 functions as a user attribute partial information storage unit. The user attribute partial information includes some item names and item values among item names and item values of a user attribute in the user attribute information 251 in the IDP user store 250. Information in which the user attribute partial information is associated with a user ID in the service provider device 300 (hereinafter, referred to as an "SP side user ID") is referred to as account registration information 311.

In other words, the SP user store 310 stores identity information of the user who uses the service data transmitted by the service provider 300. The SP user store 310 may store all the user attribute information 251 rather than the user attribute partial information in association with the SP side user ID.

Figure 9:
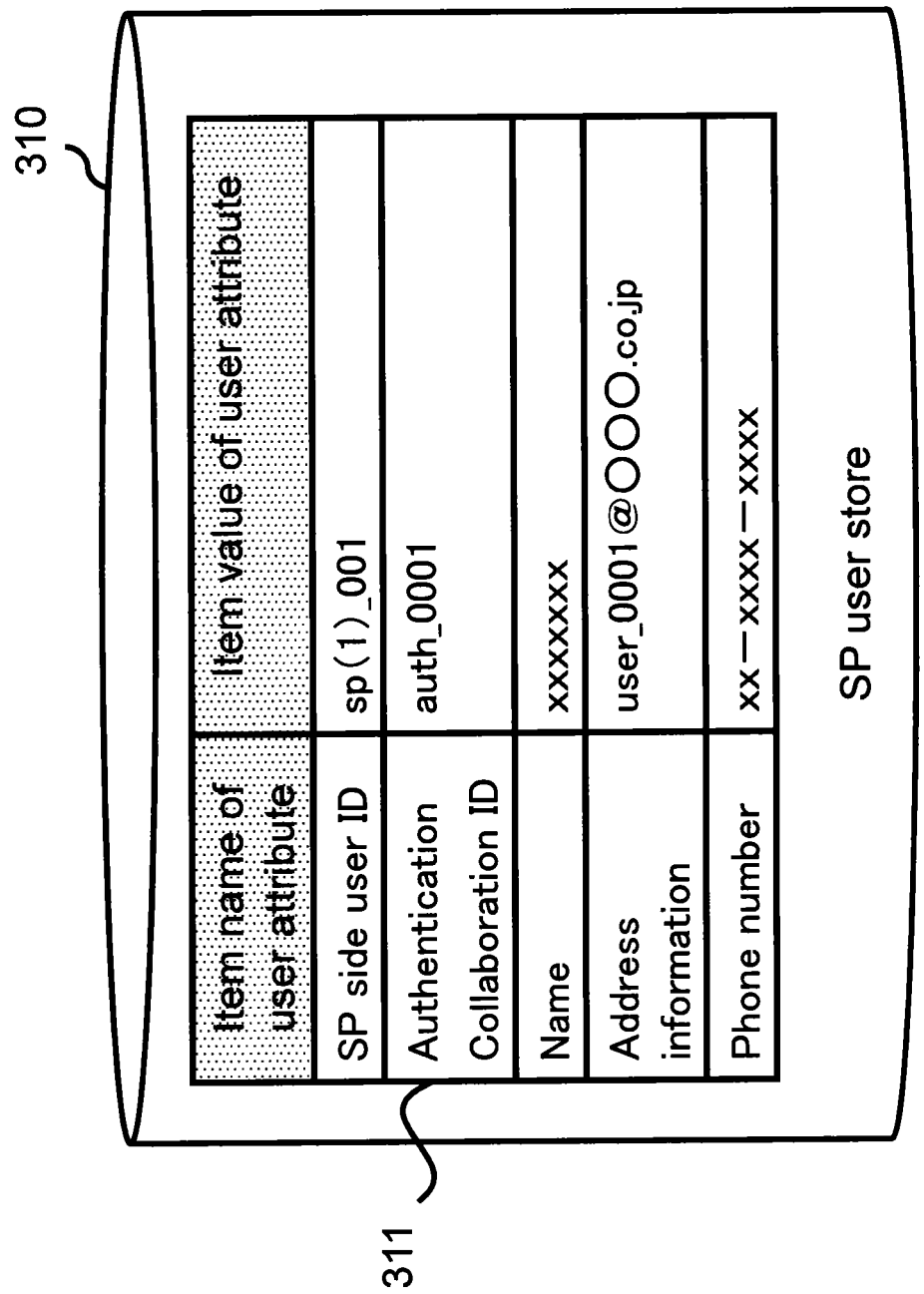
FIG. 9 is a block diagram illustrating an example of an SP user store of a service provider device according to the first embodiment.

Specifically, the SP user store 310 stores account registration information 311 in which some user attribute information such as the authentication collaboration ID, a name, address information, or a phone number is associated with the SP side user ID identifying the user in the service provider device 300 as illustrated in FIG. 9.

Figure 10:
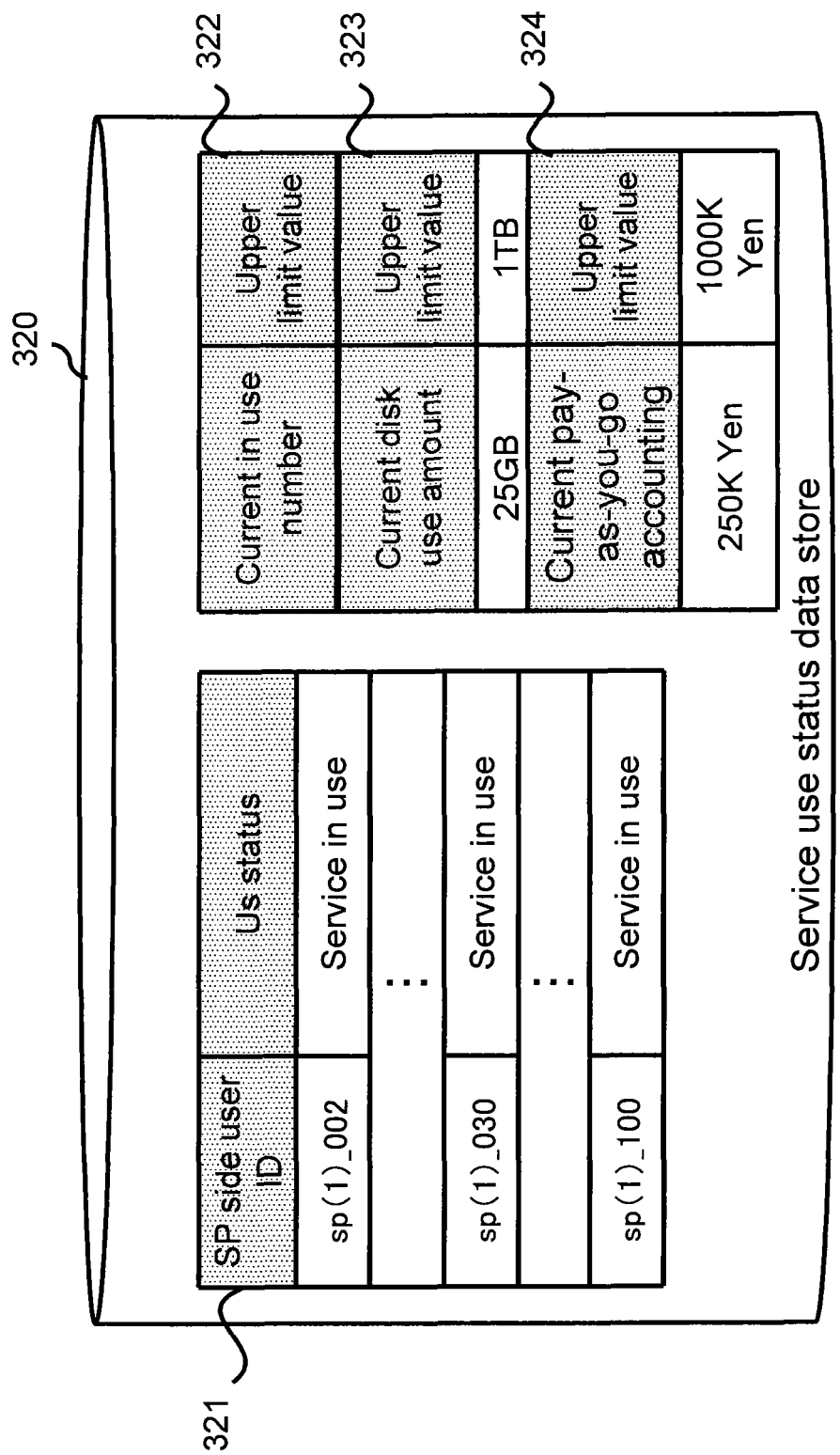
FIG. 10 is a block diagram illustrating an example of a service data store of the service provider device according to the first embodiment.

The service use status data store 320 stores a user use management table 321, an in-use number management table 322, a disk use amount management table 323, and a charging fee management table 324 of each service provider device 300 as illustrated in FIG. 10, and monitors the user's service use status.

The user use management table 321 writes the SP side user ID in association with the service use status of either "service in use" representing that transmission of service data is permitted or "service unused" representing that transmission of service data is not permitted.

The in-use number management table 322 writes the in-use number representing the number of service in use represented by the service use status in the user use management table 321 in association with an upper limit value of the in-use number.

The disk use amount management table 323 writes disk capacity used by service data of service in use represented by the service use status in the user use management table 321 in association with an upper limit value of disk capacity in the service provider device 300. The charging fee management table 324 writes a total of fees charged for a service of service in use represented by the service use status in the user use management table 321 in association with an upper limit value of a charging fee in the service provider device 300. The service use status data store 320 may store, for example, a table used to manage the number of licenses as well as the management tables 321 to 324.

The SP authentication collaborating unit 330 has an SSO service provider function. Specifically, the SP authentication collaborating unit 330 performs the authentication collaboration response checking process and an SP use response process.

The authentication collaboration response checking process is a process of verifying the authentication scheme name and the digital signature of the authentication assertion 231 generated by the IDP authentication collaborating unit 230 of the ID provider device 200 based on an authentication scheme name and a signature verification key in the authentication assertion verification policy in the verification policy store 340 which will be described later, issuing an SP authentication token when the verification results are all valid, and writing the SP authentication token in a temporary storage device 350 in association with the authentication collaboration ID and the SP side user ID.

The SP use response process is a process of sending a response that the service provider device 300 can be used to the user terminal 100 when the SP authentication token is issued in the authentication collaboration response checking process.

Figure 11:
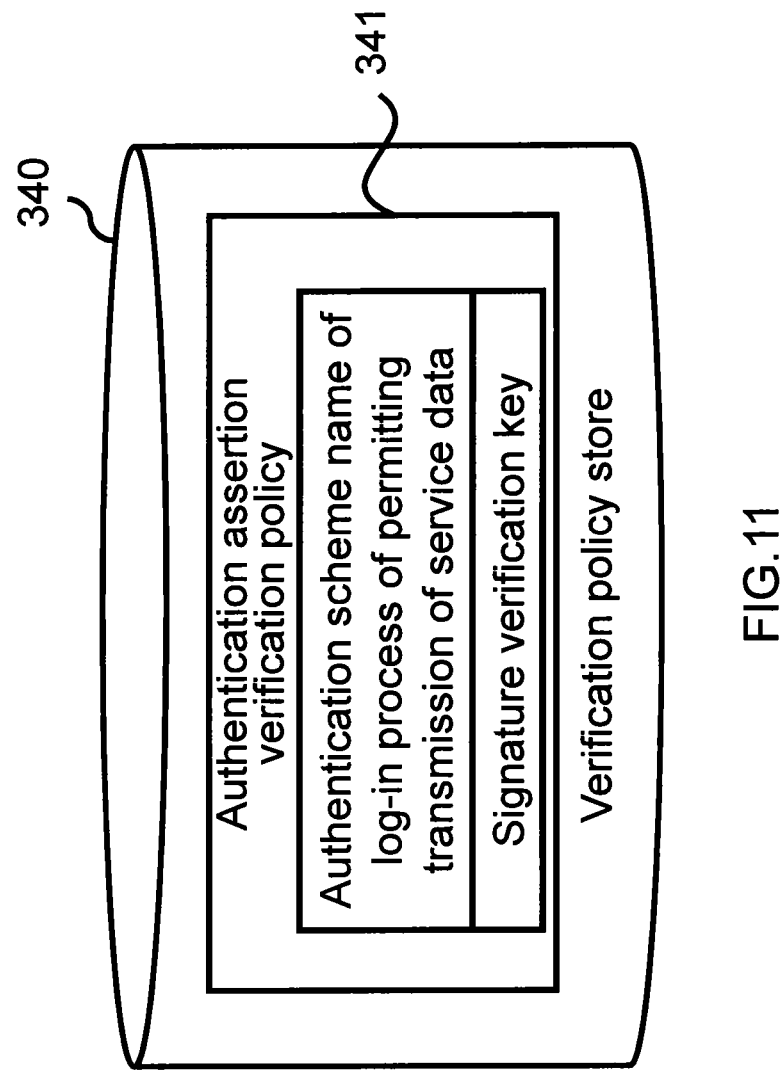
FIG. 11 is a block diagram illustrating an example of a verification policy store of the service provider device according to the first embodiment.

As illustrated in FIG. 11, when the log-in process is successfully performed, the verification policy store 340 stores a authentication assertion verification policy 341 including the authentication scheme name of the log-in process by which transmission of service data is permitted and the signature verification key corresponding to the signature generation key of the ID provider device 200. As the signature verification key, for example, of a pair of the public key and the secret key in the public key cryptosystem, the public key may be used.

Figure 12:
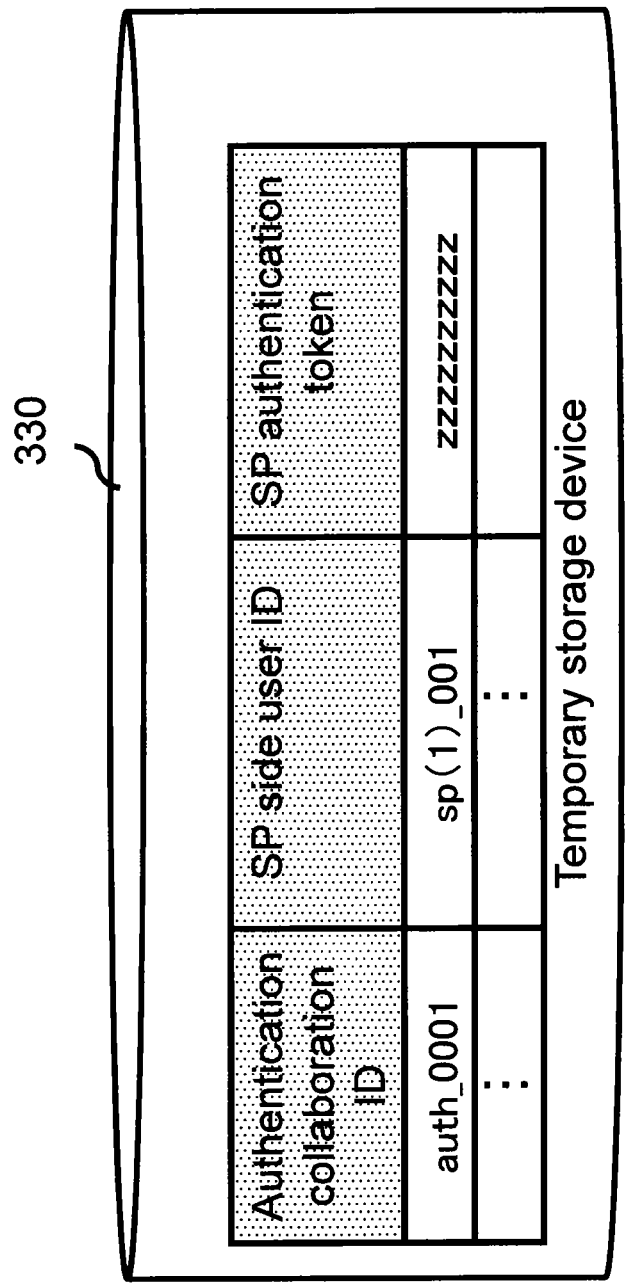
FIG. 12 is a diagram illustrating an example of a temporary storage device of the service provider device according to the first embodiment.

The temporary storage device 350 is a temporary memory such as a RAM, and for example, stores an authentication collaboration ID in the registered account registration information 311 in association with an SP side user ID and the issued SP authentication token as illustrated in FIG. 12.

Here, an authentication collaboration process of the authentication collaboration system according to the present embodiment will be described with reference to FIGS. 13 to 15.

In the present embodiment, the authentication collaboration process starts in a state in which the SSO process can be performed between the ID provider device 200 and the service provider device 300, and the user belonging to an organization of the ID provider side does not register an account to the service provider device 300. Further, there are various combinations between the log-in status of the user and the SSO request origination point from the user, but in the present embodiment, the log-in status of the user is assumed to be the completion status, and the SSO request origination point from the user is assumed to start from the service provider device 300.

Further, in the authentication collaboration system of the present embodiment, the SSO is performed according to the above-described procedure of (1) to (6).

An operation of the authentication collaboration system of the present embodiment in which in the above-mentioned state, when the user makes the service use request to the service provider device 300, the SSO process is performed, and then it is determined that the service of the service provider device 300 can be used will be described.

Figure 13:
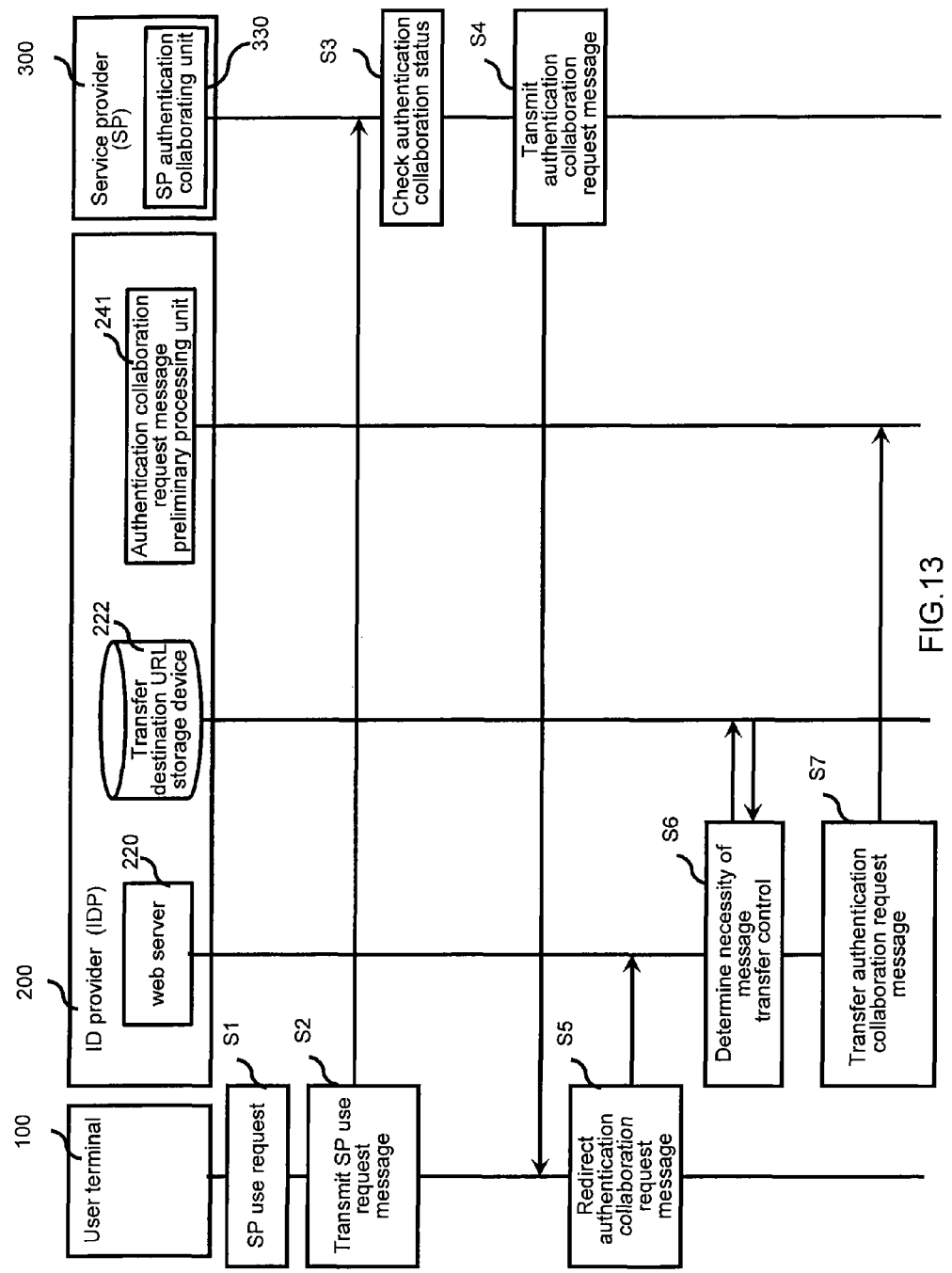
FIG. 13 is a sequence diagram illustrating an example of an operation of an authentication collaboration system according to the first embodiment.
Figure 14:
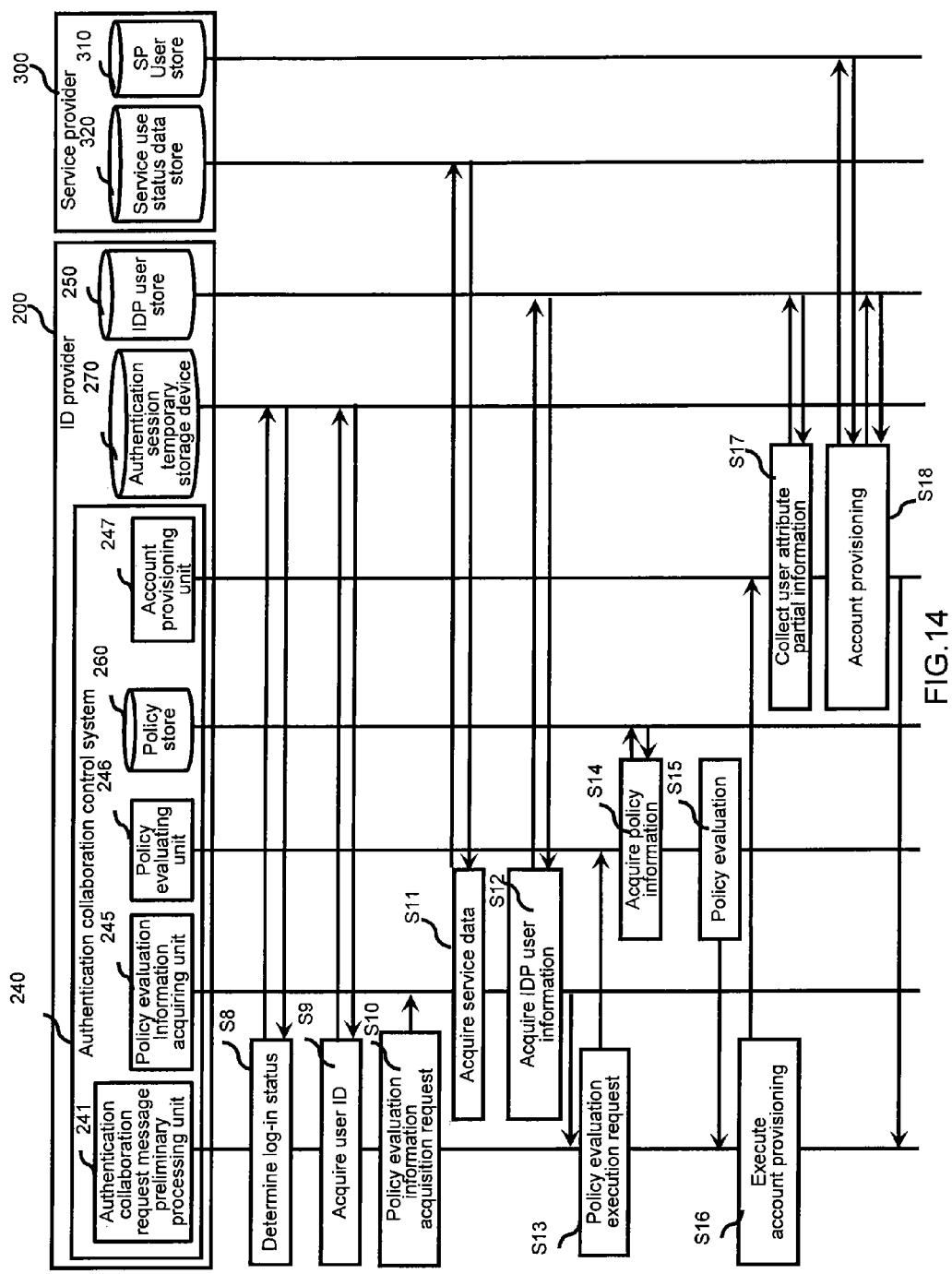
FIG. 14 is a sequence diagram illustrating an example of an operation of the authentication collaboration system according to the first embodiment.
Figure 15:
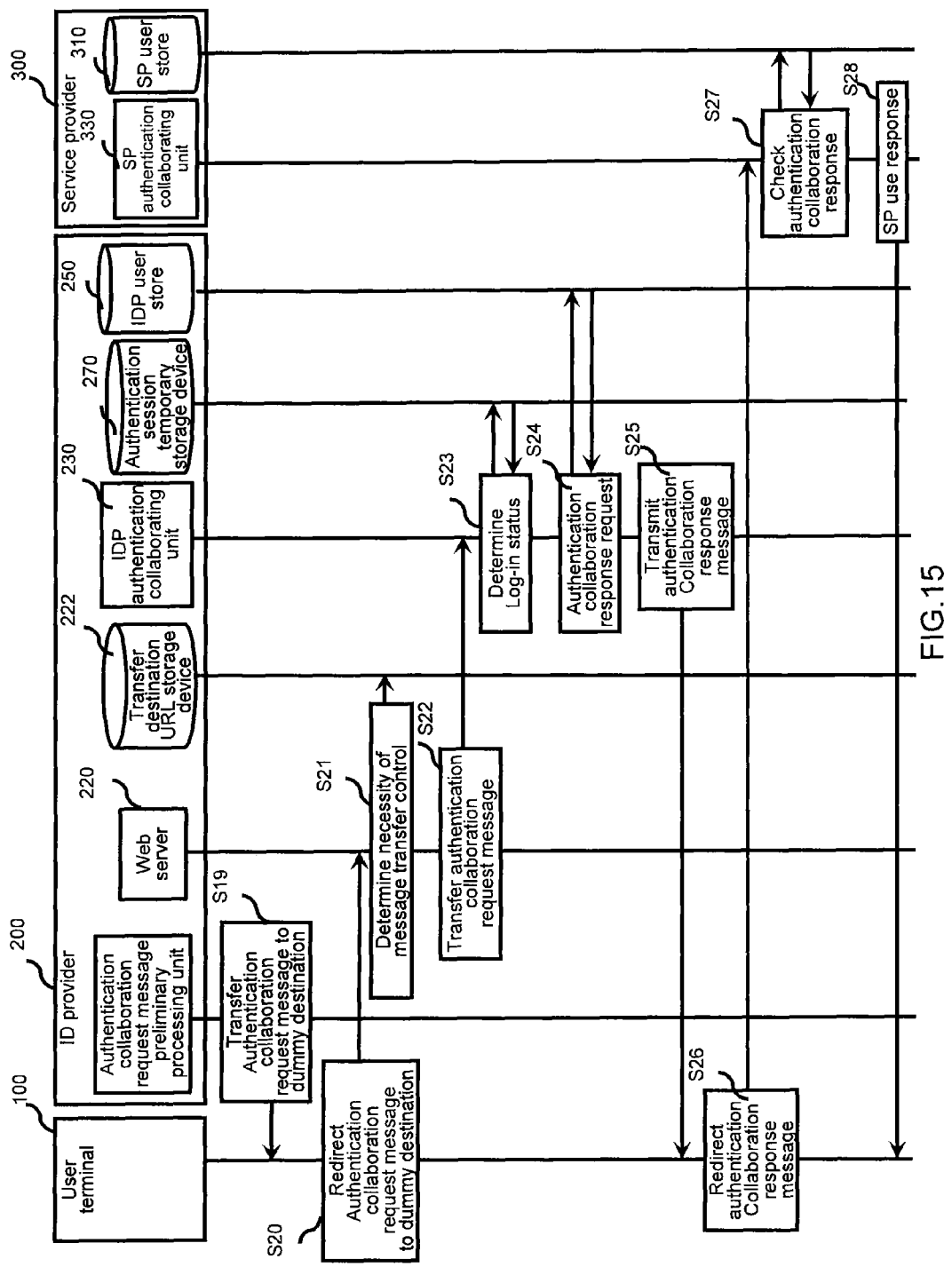
FIG. 15 is a sequence diagram illustrating an example of an operation of the authentication collaboration system according to the first embodiment.

FIGS. 13 to 15 are sequence diagrams illustrating an example of an operation of the authentication collaboration system according to the present embodiment. The sequence diagram is assigned to step numbers, and the process is assumed to be performed in the ascending order of the step numbers.

As illustrated in FIG. 13, in step S1, the user operates the user terminal 100 and makes the service request to a desired service provider device 300 in order to use the service of the service provider device 300 to which the user does not register an account yet. For example, the service request to the service provider device 300 is made by clicking a desired link among links of service open URLs displayed on a display device (not illustrated) of the user terminal 100 using an input unit (not illustrated).

In step S2, the user terminal 100 transmits the service request (hereinafter, referred to as an "SP use request message") to the service provider device 300 in response to the user's operation. The service provider device 300 receives the SP use request message through the SP authentication collaborating unit 330 undertaking the access management.

In step S3, upon receiving the SP use request message, the SP authentication collaborating unit 330 checks an authentication collaboration status of the user. For example, the authentication collaboration status is checked such that it is determined whether or not the SP authentication token issued by the SP authentication collaborating unit 330 is present in a cookie included in an HTTP request when the SP use request message from the user has an HTTP request form.

When it is determined that the SP authentication token is present, the SP authentication collaborating unit 330 regards that the authentication collaboration of the user terminal 100 has been completed. However, when the SP authentication token is not present, the SP authentication collaborating unit 330 regards that the authentication collaboration of the user terminal 100 has not been completed, and generates an authentication collaboration request message including the address information of the user terminal. In the present embodiment, the authentication collaboration is assumed to be not completed yet.

In step S4, since it is checked in step S3 that the authentication collaboration status is the authentication collaboration non-completion status, the SP authentication collaborating unit 330 issues the authentication collaboration request message directed to "the authentication collaboration request message receiving unit 232 of the IDP authentication collaborating unit 230", and transmits the authentication collaboration request message to the user terminal 100.

In step S5, upon receiving the authentication collaboration request message, the user terminal 100 redirects the authentication collaboration request message to a designated destination (here, the authentication collaboration request message receiving unit 232 of the IDP authentication collaborating unit 230).

In step S6, the authentication collaboration request message redirected by the user terminal 100 in step S5 is first received by the web server 220. When the web server 220 receives the authentication collaboration request message, the reverse proxy device 221 determines whether or not message transfer is necessary based on the transfer destination URL management table 223 stored in the transfer destination URL storage device 222. As the determination method, an URL matching the destination of the received authentication collaboration request message is searched for in an Internet open URL field of the transfer destination URL management table 223. Here, since ID "1-A" of No. 1 is matched, "the authentication collaboration request message preliminary processing unit 241 of the authentication collaboration control system 240" of ID "1-B" is decided as the transfer destination.

In step S7, the web server 220 transfers the authentication collaboration request message to the destination, that is, "the authentication collaboration request message preliminary processing unit 241 of the authentication collaboration control system 240" of ID "1-B" which is determined as the transfer destination in the determination of the previous step through the reverse proxy device 221. Next, the process of FIG. 14 is performed.

In step S8 of FIG. 14, the log-in status determining unit 242 of the authentication collaboration request message preliminary processing unit 241 that has received the transferred authentication collaboration request message determines the log-in status of the user. The log-in status is checked according to the presence or absence of the IDP authentication token in the authentication session temporary storage device 270. According to the present embodiment, since the log-in status is the log-in completion status, the IDP authentication token is present in the authentication session temporary storage device 270. Thus, the log-in status determining unit 242 determines that the log-in status is the log-in completion status, and transmits the determination result to the user ID acquiring unit 243.

Next, in step S9, the user ID acquiring unit 243 acquires the user ID associated with the IDP authentication token checked in step S8 from the authentication session temporary storage device 270.

In step S10, the authentication collaboration request message preliminary processing unit 241 requests the policy evaluation information acquiring unit 245 to acquire the policy evaluation information. At this time, the user ID acquired in step S9 is also transmitted to the policy evaluation information acquiring unit 245.

In step S11, the policy evaluation information acquiring unit 245 accesses the service use status data store 320 of the service provider device 300, and acquires the service use status information 321 to 324 (hereinafter, referred to as a "service use status information acquisition process").

In step S12, the policy evaluation information acquiring unit 245 acquires the user attribute information 251 from the IDP user store 250 illustrated in FIG. 4 using the user ID received from the authentication collaboration request message preliminary processing unit 241 as a search key (hereinafter, referred to as a "user attribute information acquisition process").

In step S13, the authentication collaboration request message preliminary processing unit 241 requests the policy evaluating unit 246 to execute policy evaluation. At this time, the service use status information 321 to 324 obtained by execution of step S11 is combined with the user attribute information 251 obtained by execution of step S12 as the policy evaluation information, and the policy evaluation information is transferred to the policy evaluating unit 246.

In step S14, the policy evaluating unit 246 acquires the policy information 261 related to the service provider device 300 designated by the user from the policy store 260 of FIG. 8.

In step S15, the policy evaluating unit 246 performs policy evaluation using the policy evaluation information acquired in step S13 and the policy information acquired in step S14. Hereinafter, the process of steps S13 to S15 is referred to as a "policy evaluation process."

As a result of the policy evaluation process, it is determined whether or not the user can use the service. In the present embodiment, the service use is assumed to be permitted.

In step S16, when the service use is permitted, the account provisioning unit 247 of the authentication collaboration request message preliminary processing unit 241 executes account provisioning related to the user. At this time, the user ID acquired in step S12 is also transmitted.

In step S17, the account provisioning unit 247 acquires the user attribute partial information which is some attribute information of the user attribute information 251 of the user from the IDP user store 250 using the user ID received in step S16 as the search key.

In step S18, the account provisioning unit 247 generates the SP side user ID of the user, registers the SP side user ID of the user to the SP user store 310 in association with the acquired user attribute partial information, and also registers the authentication collaboration ID connecting both accounts of the ID provider device 200 and the service provider device 300. In the present embodiment, the user ID of the ID provider device 200 is designated as the authentication collaboration ID.

Hereinafter, the process of steps S16 to S18 is referred to as an "account provisioning process (an account collaboration process)." Next, the process of step S19 of FIG. 15 is performed.

In step S19 of FIG. 15, the authentication collaboration request message transferring unit 244 of the authentication collaboration request message preliminary processing unit 241 designates a dummy URL which is not present in the ID provider device 200 as the destination, and transmits the authentication collaboration request message to the user terminal 100. Here, the dummy URL is assumed to be the dummy (1) URL.

In step S20, the user terminal 100 that has received the authentication collaboration request message redirects the authentication collaboration request message to a designated URL, that is, the dummy (1) URL.

In step S21, the web server 220 first receives the authentication collaboration request message redirected by the user terminal 100. The reverse proxy device 221 of the web server 220 determines whether or not the message transfer is necessary based on the transfer destination URL management table 223 stored in the transfer destination URL storage device 222. As the determination method, an URL matching the destination of the authentication collaboration request message received in step S20 is searched for in an Internet open URL field of the transfer destination URL management table 223. Here, since ID "1-C" is matched, ID "1-D", that is, the authentication collaboration request message receiving unit 232 of the IDP authentication collaborating unit 230 is decided as the transfer destination. Next, the message transfer process is performed.

In step S22, based on the determination result of step S21, the reverse proxy device 221 of the web server 220 designates the authentication collaboration request message receiving unit 232 of the IDP authentication collaborating unit 230 as the destination, and transfers the authentication collaboration request message.

In step S23, after receiving the authentication collaboration request message, the authentication collaboration request message receiving unit 232 of the IDP authentication collaborating unit 230 checks the log-in status of the user. For example, the log-in status is checked by checking whether or not the IDP authentication token issued to the user remains stored in the authentication session temporary storage device 270. In the present embodiment, since the log-in status is the log-in completion status, the IDP authentication token is present.

In step S24, since it is checked the log-in status is the log-in completion status, the authentication collaboration request message receiving unit 232 of the IDP authentication collaborating unit 230 requests the authentication collaboration response message transmitting unit 235 to transmit the authentication collaboration response message. The authentication collaboration response message includes authentication assertion informing the service provider 300 of the fact that the user has been authenticated by the ID provider device 200.

In step S25, the authentication collaboration response message transmitting unit 235 generates the authentication assertion verifying that the user has been authenticated by the ID provider device 200 side, and generates the authentication collaboration response message including the generated authentication assertion. The generated authentication collaboration response message is transmitted to the user terminal 100 using the SP authentication collaborating unit 330 as the destination.

In step S26, the user terminal 100 redirects the received authentication collaboration response message to the SP authentication collaborating unit 330 which is the designated destination.

In step S27, the SP authentication collaborating unit 330 that has received the authentication collaboration response message performs the authentication collaboration response checking process, and performs the authentication collaboration based on the checking result.

In the authentication collaboration response checking process, specifically, the SP authentication collaborating unit 330 performs verification of the authentication assertion included in the received message. Further, the verification of the authentication assertion is performed according to the authentication assertion verification policy of the verification policy store 340 illustrated in FIG. 11.

When there is no problem as a result of verification, the SP authentication collaborating unit 330 completes the authentication collaboration, and issues the SP authentication token. For example, the SP authentication token issued by the SP authentication collaborating unit 330 is stored in an HTTP cookie or session information. The process of steps S24 to S27 is referred to as an "authentication collaboration response process."

In step S28, the SP authentication collaborating unit 330 that has completed the authentication collaboration transmits an SP use response message including the SP authentication token and the service data to the user terminal 100, and performs the SP use response process of notifying the user of the fact that it is possible to use. Then, the SSO process between the user belonging to the ID provider device 200 and the service provider device 300 ends.

As described above, according to the authentication collaboration system of the present embodiment, when the user belonging to the organization of the ID provider device 200 does not register an account to the service provider device 300, the log-in status of the user is the completion status, and the SSO request origination point from the user starts from the service provider device 300, it is possible to determine whether or not the service can be used without requiring a manual operation when the account registration and collaboration are executed in the process of the SSO.

Specifically, in the authentication collaboration system of the present embodiment, between (2) and (3) of the SSO process procedure, after it is evaluated whether or not the user who has made the authentication collaboration request can use the service provided by the service provider device 300 based on the policy information 261 related to the service use previously stored in the policy store 260 and the use status 321 to 324 of the service use status data store 320, the process of performing account registration to the service provider device 300 and account collaboration is inserted, and thus a series of processes from the use request of the service provided by the service provider device 300 through the user terminal 100 to the SSO can be automated. Thus, according to the authentication collaboration system of the present embodiment, the user can smoothly start the service use without requiring manpower such as seniors of the user or the IS section.

Further, according to the authentication collaboration system of the present embodiment, the authentication collaboration server 230 of the ID provider device 200 can insert the account provisioning process of performing policy evaluation and account registration/account collaboration immediately before the SSO procedure (3) while continuously performing the process of the SSO procedures (2) to (4) without directly modifying the authentication collaboration server product of the ID provider device. Thus, it is possible to provide the authentication collaboration system in which the introduction cost is low and it can be easily determined whether or not the service can be used without a manual operation.

Further, according to the authentication collaboration system of the present embodiment, the origination point at which the user requests the SSO is a point in time at which an operation of the service provider device 300 starts, and when the log-in of the user is completed, policy evaluation and account provisioning can be executed at an appropriate timing.

Second Embodiment

An authentication collaboration system of a second embodiment will be described with reference to FIGS. 16 to 19.

In the present embodiment, similarly to the first embodiment, the process starts in a state in which the SSO process can be performed between the ID provider device 200 and the service provider device 300, and the user belonging to an organization in which the ID provider device 200 is installed does not register an account to the service provider device 300. Further, in the authentication collaboration system of the present embodiment, similarly to the first embodiment, the SSO is assumed to be performed according to the procedure of (1) to (6).

Further, there are various combinations between the log-in status of the user and the SSO request origination point from the user, but in the present embodiment, the log-in status of the user is assumed to be the non-completion status, and the SSO request origination point from the user is assumed to start from the service provider device 300.

Here, a functional configuration of the authentication collaboration system of the present embodiment will be described with reference to FIG. 16. The same components as in the first embodiment are denoted by the same reference numerals, and a description thereof will not be made.

Figure 16:
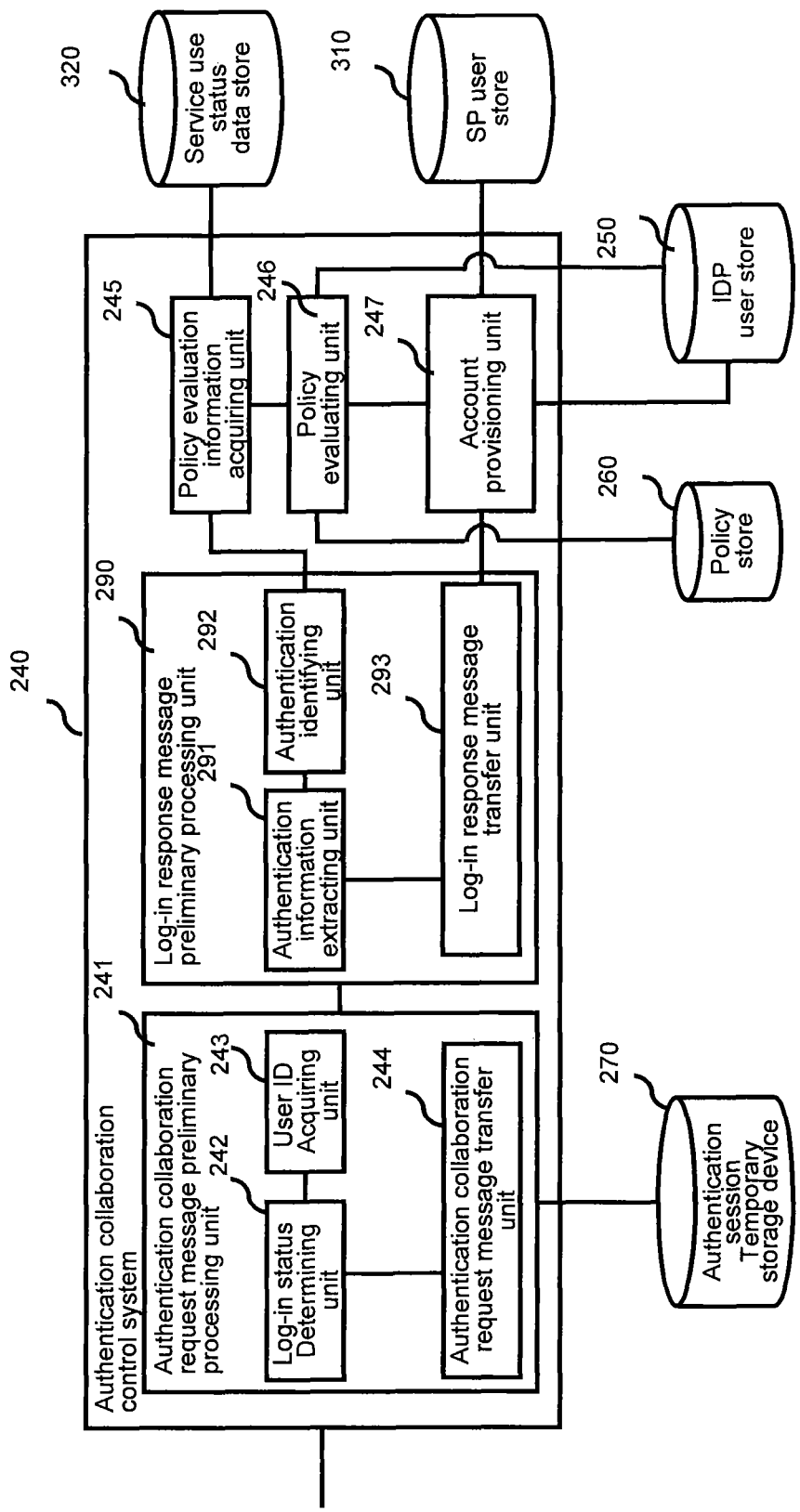
FIG. 16 is a block diagram illustrating an example of a functional configuration of an authentication collaboration system according to a second embodiment.

FIG. 16 is a diagram illustrating one example of a functional configuration of the authentication collaboration control system 240 of the present embodiment. As illustrated in FIG. 16, the authentication collaboration control system 240 of the present embodiment includes a policy evaluation information acquiring unit 245, a policy evaluating unit 246, an account provisioning unit 247, and a log-in response message preliminary processing unit 290.

The log-in response message preliminary processing unit 290 includes an authentication information extracting unit 291, an authentication identifying unit 292, and a log-in response message transfer unit 293.

When the log-in response message is received from the user terminal 100, the authentication information extracting unit 291 extracts the user ID and the password included in the log-in response message as authentication information. When the user has not completed the log-in, the user terminal 100 inputs the log-in response message in order to respond to the log-in request message transmitted from the ID provider device 200. For example, when the user has not completed the log-in, the log-in response message is input through a log-in screen displayed on the user terminal 100. Specifically, a column used to input the user ID and the password is displayed on the log-in screen.

The authentication identifying unit 292 performs user authentication and identification based on the authentication information extracted by the authentication information extracting unit 291 and the user ID and the reference information included in the IDP user store 250 illustrated in FIG. 4.

Specifically, the authentication identifying unit 292 searches the IDP user store 250 based on the user ID extracted by the authentication information extracting unit 291, and determines whether or not the reference information included in the user attribute information matching the user ID matches the password extracted by the authentication information extracting unit 291.

The log-in response message transfer unit 293 transfers the log-in response message to the dummy URL.

Figure 17:
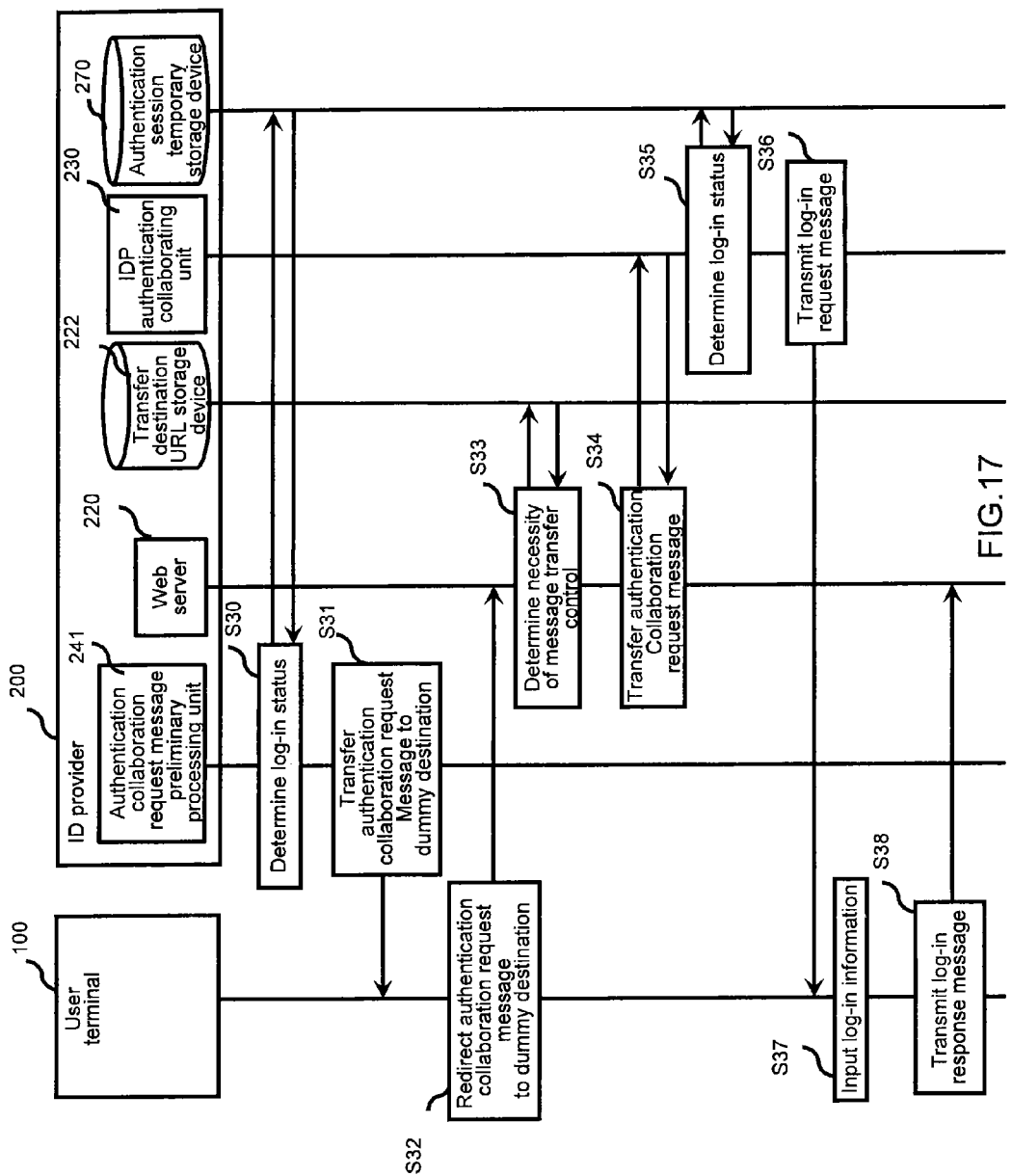
FIG. 17 is a sequence diagram illustrating an example of an operation of the authentication collaboration system according to the second embodiment.
Figure 18:
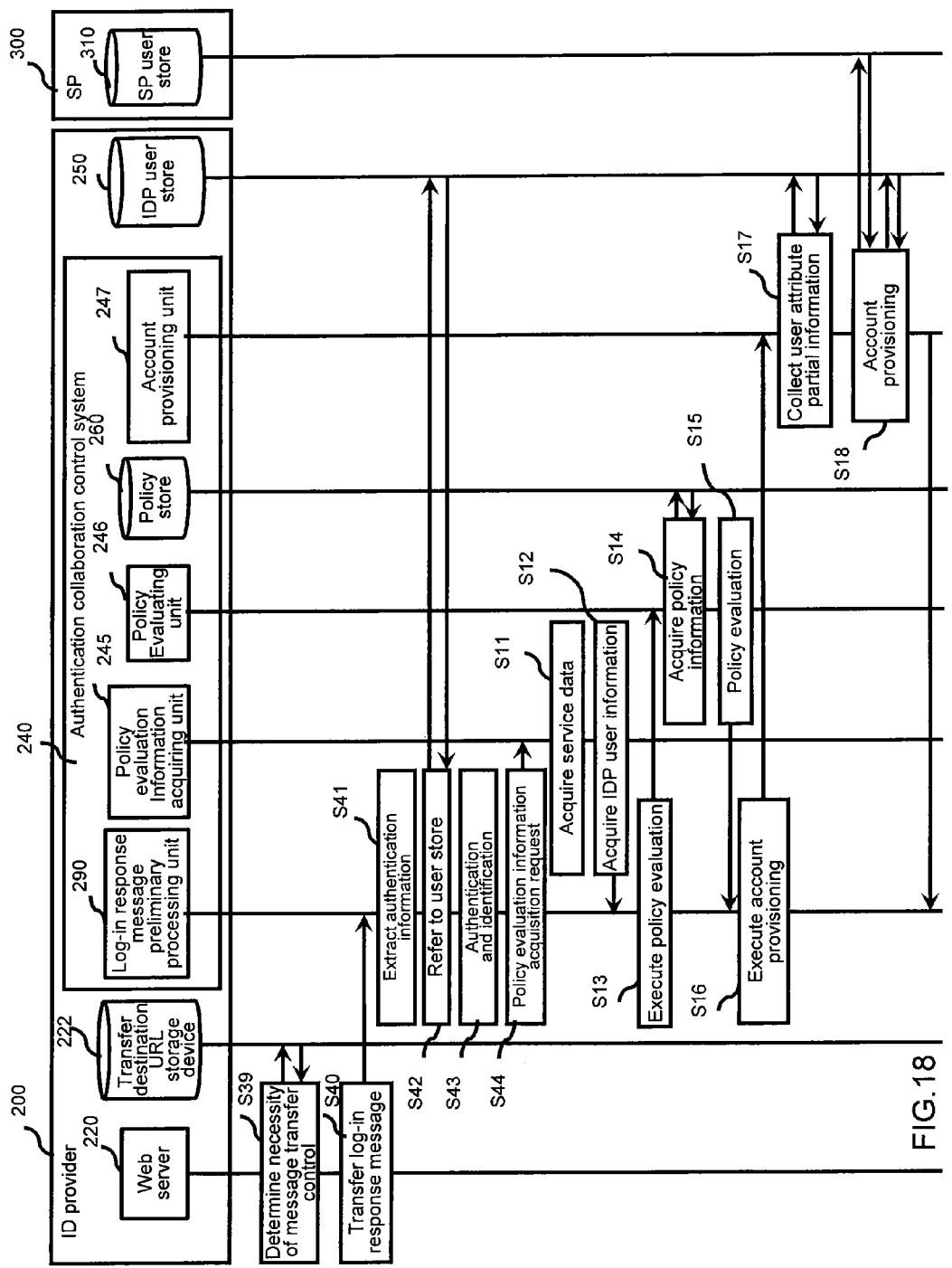
FIG. 18 is a sequence diagram illustrating an example of an operation of the authentication collaboration system according to the second embodiment.
Figure 19:
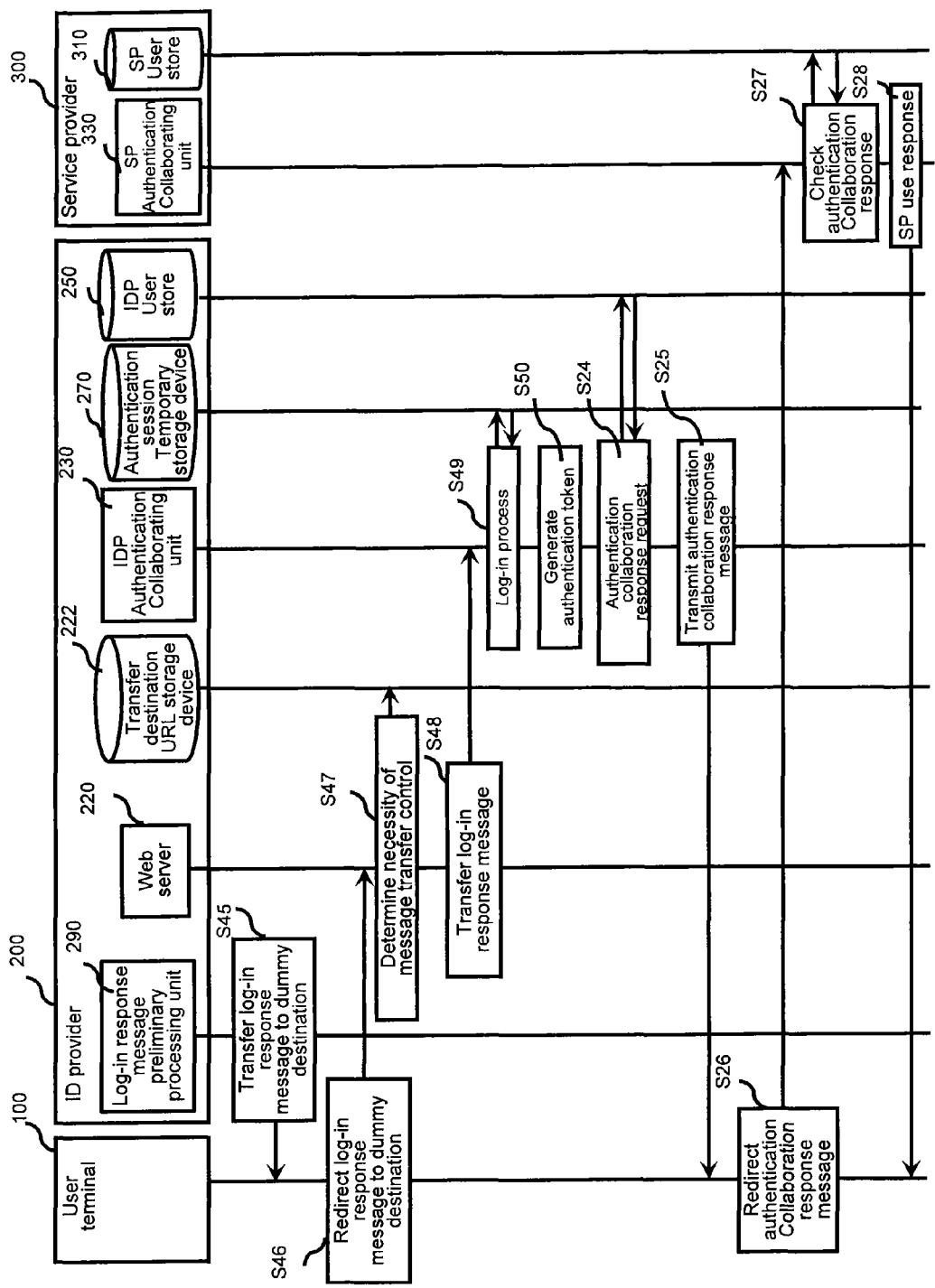
FIG. 19 is a sequence diagram illustrating an example of an operation of the authentication collaboration system according to the second embodiment.

The authentication collaboration process of the authentication collaboration system of the present embodiment in which when the user makes the service use request to the service provider device 300, the SSO process is executed, and it is determined that the service of the service provider device 300 can be used will be described with reference to FIGS. 17 to 19. FIGS. 17 to 19 are sequence diagrams illustrating an example of the authentication collaboration process according to the present embodiment.

In the authentication collaboration process according to the present embodiment, the process of steps S1 to S7 illustrated in FIG. 13 is performed, and then the process of steps S30 to S50 illustrated in FIGS. 17 to 19 is performed.

The process of steps S1 to S7 is the same as in the first embodiment, and thus a description thereof will not be made, and the description will proceed with the process of step S30 of FIG. 17.

In step S30, the log-in status determining unit 242 according to the present embodiment determines that the log-in status is the non-completion status, and transmits the determination result to the authentication collaboration request message transferring unit 244.

In step S31, the authentication collaboration request message transferring unit 244 transfers the authentication collaboration request message to arrive at the dummy URL. Here, the dummy (1) URL is set as the dummy URL.

In step S32, the user terminal 100 that has received the authentication collaboration request message redirects the authentication collaboration request message to the designated URL, that is, the dummy (1) URL.

In step S33, the web server 220 first receives the authentication collaboration request message redirected by the user terminal 100. The reverse proxy device 221 of the web server 220 determines whether or not the message transfer is necessary based on the transfer destination URL management table 223 stored in the transfer destination URL storage device 222. Here, since ID "1-C" is matched, ID "1-D," that is, the authentication collaboration request message receiving unit 232 of the IDP authentication collaborating unit 230 is determined as the transfer destination. Next, the message transfer process is performed.

In step S34, based on the determination result of step S33, the reverse proxy device 221 of the web server 220 designates the authentication collaboration request message receiving unit 232 of the IDP authentication collaborating unit 230 as the destination, and transfers the authentication collaboration request message.

In step S35, after receiving the authentication collaboration request message, the authentication collaboration request message receiving unit 232 of the IDP authentication collaborating unit 230 checks the log-in status of the user. The checking of the log-in status is the same process of step S8 of FIG. 14, and thus a description thereof will not be made. In the present embodiment, the log-in status is the log-in non-completion.

In step S36, the log-in request message transmitting unit 233 transmits the log-in request message to the user terminal 100 based on the determination result of step S35.

In step S37, the user terminal 100 that has received the log-in request message displays the log-in screen, and the user inputs the user ID and the password through the log-in screen.

In step S38, the user terminal 100 transmits the log-in response message including the user ID and the password input in step S37 to the log-in response message receiving unit 234 of the IDP authentication collaborating unit 230 serving as the destination.

Next, the process proceeds to step S39 of FIG. 18.

In step S39 of FIG. 18, the web server 220 first receives the log-in response message transmitted by the user terminal 100 in step S38. The reverse proxy device 221 of the web server 220 determines whether or not the transfer control of the log-in response message is necessary based on the transfer destination URL management table 223 stored in the transfer destination URL storage device 222. As the determination method, an URL matching the destination of the received log-in response message is searched for in the Internet open URL field of the transfer destination URL management table 223. Here, since ID "3-A" is matched, it is determined that the message transfer is necessary. Further, when the matching URL is not present in the transfer destination URL management table 223, it is determined that the transfer control is unnecessary.

Here, ID "3-B," that is, the log-in response message preliminary processing unit 290 of the authentication collaboration system 240 is determined as the transfer destination. Next, the message transfer process is performed.

In step S40, based on the determination result of step S39, the reverse proxy device 221 of the web server 220 designates the log-in response message preliminary processing unit 290 as the destination, and transfers the log-in response message.

In step S41, the authentication information extracting unit 290 of the log-in response message preliminary processing unit 291 extracts the user ID and the password from the received log-in response message as the authentication information.

In step S42, the authentication identifying unit 292 of the log-in response message preliminary processing unit 290 searches for the user attribute information of the IDP user store 250 using the user ID extracted in step S41 as the search key, and acquires the password.

In step S43, the authentication identifying unit 292 of the log-in response message preliminary processing unit 290 compares the acquired password with the password extracted from the log-in response message, performs user authentication, and identifies the user using the user ID. In the present embodiment, the user is assumed to be authenticated.

In step S44, the log-in response message preliminary processing unit 290 transmits a policy evaluation information acquisition request to the policy evaluation information acquiring unit 245. At this time, the user ID acquired from the log-in response message is also transmitted together.

Subsequently to the process of step S44, the service data acquisition process of step S11 of FIG. 14, the user attribute information acquisition process of step S12 of FIG. 14, the policy evaluation process of steps S13 to S15, and the account provisioning process of steps S16 to S18 are performed. The processes have been already described in the first embodiment and will not be here described.

Next, in step S45 of FIG. 19, the log-in response message transfer unit 293 of the log-in response message preliminary processing unit 290 designates the dummy URL which is not presented in the ID provider device 200 as the destination, and transfers the log-in response message toward the user terminal 100. In the present embodiment, the dummy URL which is the transfer destination of the log-in response message transfer unit 293 remains set in advance, and a "dummy (3) URL" is set as the dummy URL.

In step S46, the user terminal 100 that has received the log-in response message redirects the log-in response message to the dummy (3) URL which is the destination.

In step S47, the web server 220 first receives the log-in response message redirected by the user terminal 100. Here, the reverse proxy device 221 of the web server 220 determines whether or not the message transfer is necessary based on the transfer destination URL management table 223 stored in the transfer destination URL storage device 222.

As the determination method, an URL matching the destination of the received log-in response message in an Internet open URL field of the transfer destination URL management table 223 is searched for. When the matching URL is present, it is determined that the transfer control is necessary. Here, since ID "3-C" is matched, ID "3-D" of the corresponding transfer destination URL is determined as the transfer destination. In other words, the reverse proxy device 221 determines whether or not it is necessary to transfer the log-in response message to the log-in response message receiving unit 234 of the IDP authentication collaborating unit 230.

In step S48, based on the determination result of step S47, the reverse proxy device 221 of the web server 220 designates the log-in response message receiving unit 234 of the IDP authentication collaborating unit 230 as the destination, and transfers the log-in response message.

In step S49, the log-in response message receiving unit 234 of the IDP authentication collaborating unit 230 performs the log-in process based on the received log-in response message. In the log-in process, specifically, the log-in response message receiving unit 234 acquires the user ID and the password from the received log-in response message. The log-in response message receiving unit 234 acquires the password from the IDP user store 250 using the acquired user ID as the search key, compares the acquired password with the password extracted from the log-in response message to perform user authentication. In the present embodiment, the user is assumed to be authenticated.

In step S50, the log-in response message receiving unit 234 issues the IDP authentication token representing that the log-in is completed in the ID provider device 200, and stores the IDP authentication token in the authentication session temporary storage device 270 together with the user ID.

Subsequently to step S50, the authentication collaboration response process of steps S24 to S27 of FIG. 15 and the SP use response process of step S28 are performed, and then the authentication collaboration process according to the present embodiment ends.

As described above, according to the authentication collaboration system of the present embodiment, when the user belonging to the organization of the ID provider device 200 does not register an account to the service provider device 300, the log-in status of the user is the non-completion status, and the SSO request origination point from the user starts from the service provider device 300, it is possible to determine whether or not the service can be used without requiring a manual operation when the account registration and collaboration are executed in the process of the SSO.

Further, according to the authentication collaboration system of the present embodiment, when the user belonging to the organization of the ID provider device 200 does not register an account to the service provider device 300, the log-in status of the user is the non-completion status, and the SSO request origination point from the user starts from the service provider device 300, policy evaluation and account provisioning can be executed at an appropriate timing.

Third Embodiment

An authentication collaboration system according to a third embodiment will be described with reference to FIGS. 20 to 24.

In the present embodiment, similarly to the first embodiment, the process starts in a state in which the SSO process can be performed between the ID provider device 200 and the service provider device 300, and the user belonging to an organization of the ID provider device 200 side does not register an account to the service provider device 300.

Further, there are various combinations between the log-in status of the user and the SSO request origination point from the user, but in the present embodiment, the log-in status of the user is assumed to be the completion status, and the SSO request origination point from the user is assumed to start from the ID provider device 200 (an IDP start model).

The IDP start model is a model in which the process starts when the user transmits requests the ID provider to provide the service of the service provider in the SSO procedure (1). Thus, in the present embodiment, the SSO procedure (2) is not performed, and the process of (3) to (6) is performed subsequently to the procedure (1).

Here, a functional configuration of the authentication collaboration system of the present embodiment will be described with reference to FIGS. 20 and 21. The same components as in the first embodiment and the second embodiment are denoted by the same reference numerals, and a description thereof will not be made.

Figure 20:
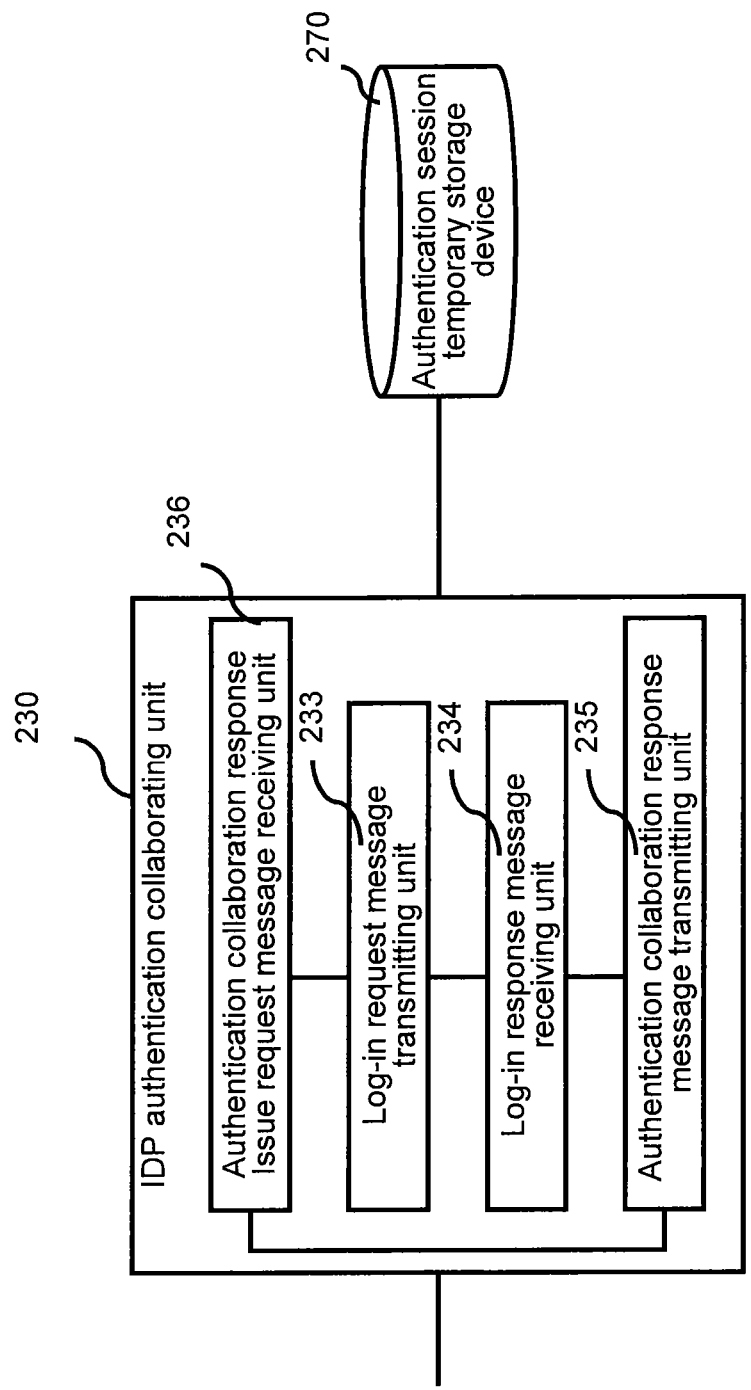
FIG. 20 is a block diagram illustrating an example of a functional configuration of an authentication collaboration system according to a third embodiment.

FIG. 20 is a diagram illustrating an example of a function configuration of an IDP authentication collaborating unit 230 of the present embodiment.

As illustrated in FIG. 20, the IDP authentication collaborating unit 230 of the present embodiment includes a log-in request message transmitting unit 233, a log-in response message receiving unit 234, an authentication collaboration response message transmitting unit 235, and an authentication collaboration response issue request message receiving unit 236.

The authentication collaboration response issue request message receiving unit 236 receives an authentication collaboration response issue request message. The authentication collaboration response issue request message is an authentication collaboration request message which is issued in the IDP start model, and directed to the service provider device 300. In other words, the ID provider device 200 that has received the service use request from the user terminal 100 issues the message in order to request the service provider device 300 to perform authentication collaboration.

An authentication collaboration request message issued by the service provider device 300 is referred to as an SP authentication collaboration request message, and an authentication collaboration request message (an authentication collaboration response issue request message) issued by the ID provider device 200 may be used as an IDP authentication collaboration request message.

Figure 21:
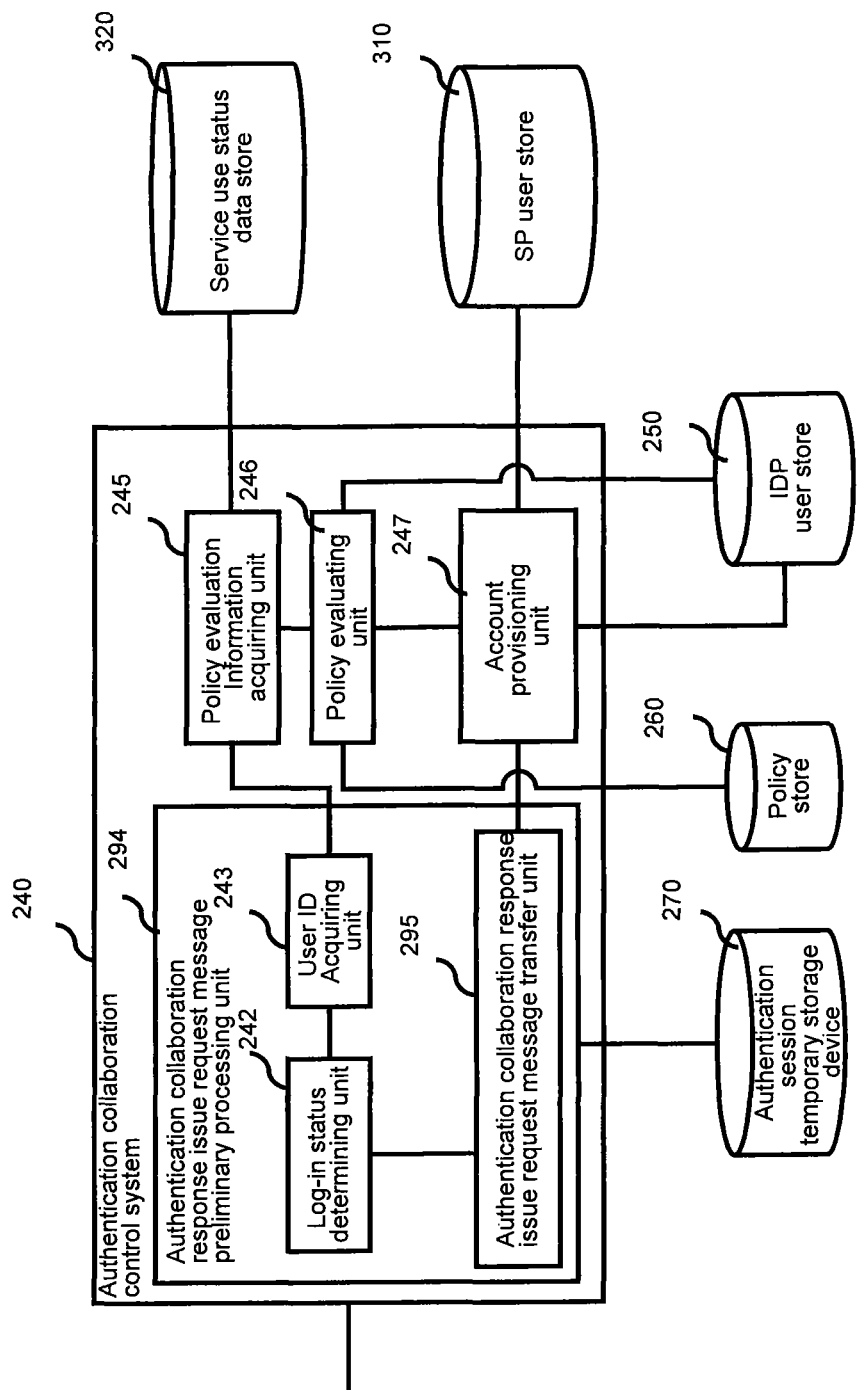
FIG. 21 is a block diagram illustrating an example of a functional configuration of the authentication collaboration system according to the third embodiment.

FIG. 21 is a diagram illustrating an example of a functional configuration of the authentication collaboration control system 240 of the present embodiment. As illustrated in FIG. 21, the authentication collaboration control system 240 of the present embodiment includes an authentication collaboration response issue request message preliminary processing unit 294.

The authentication collaboration response issue request message preliminary processing unit 294 includes an authentication collaboration response issue request message transfer unit 295, and performs the transfer process of the received authentication collaboration response issue request message.

Figure 22:
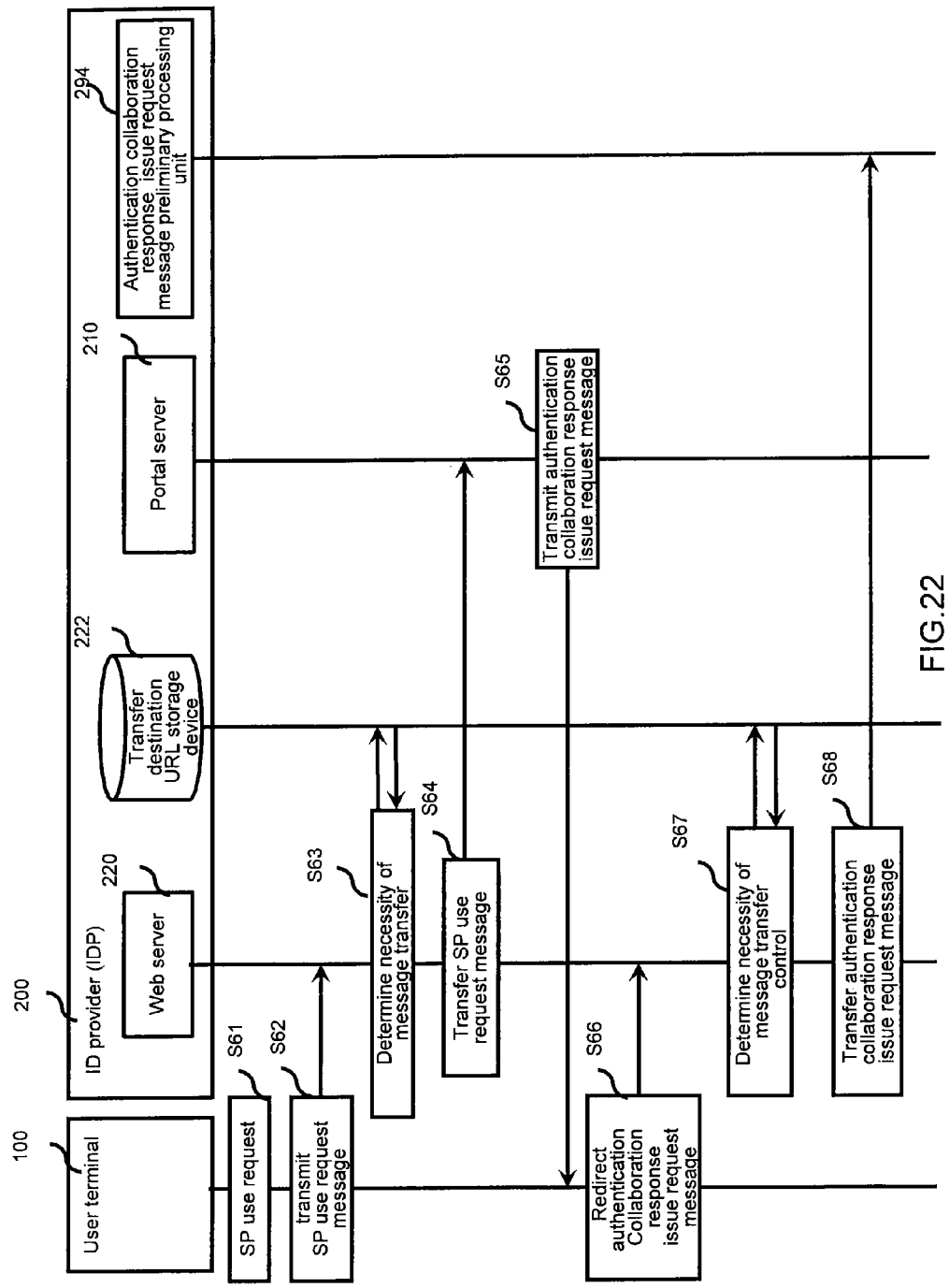
FIG. 22 is a sequence diagram illustrating an example of an operation of the authentication collaboration system according to the third embodiment.
Figure 23:
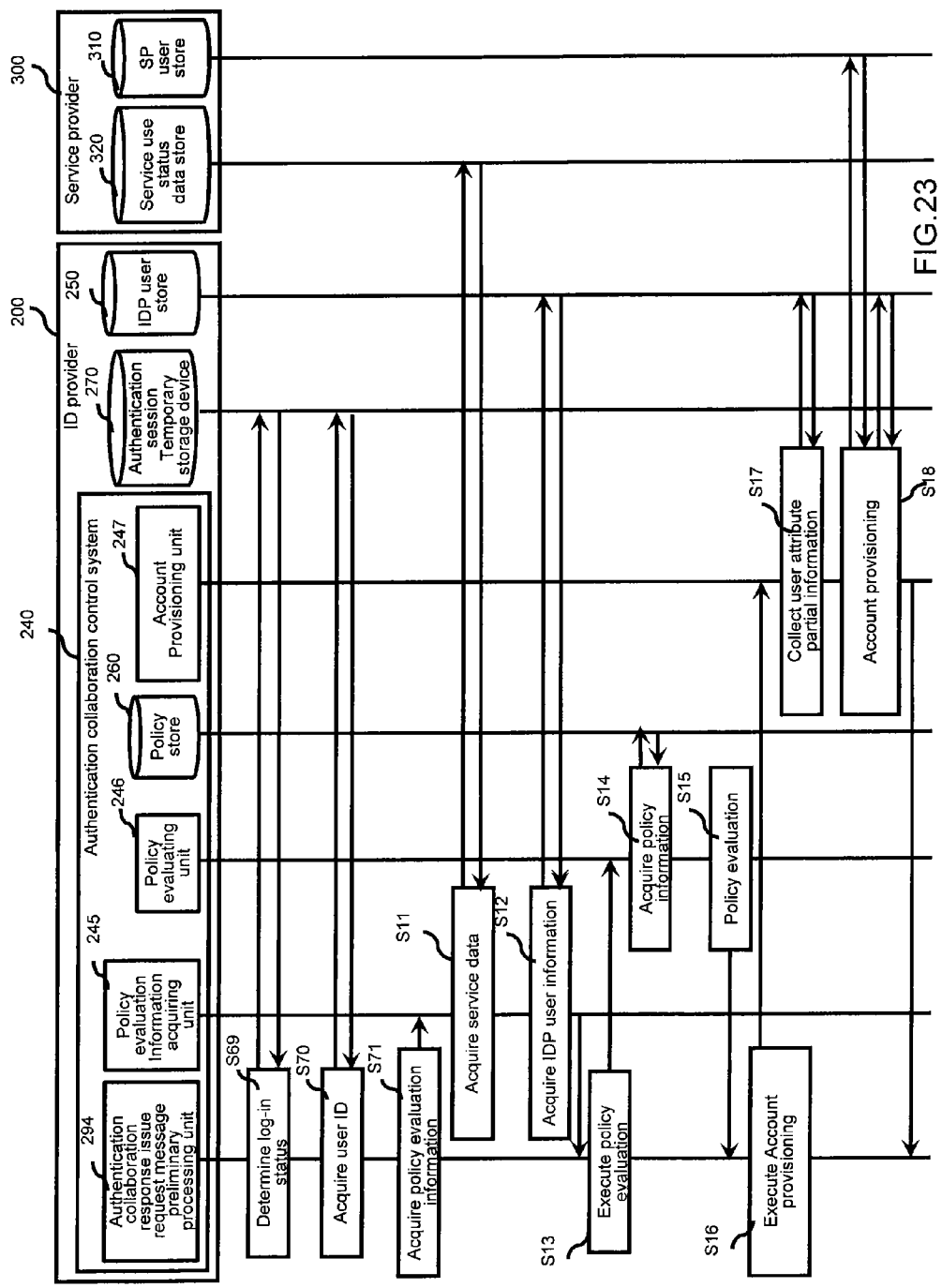
FIG. 23 is a sequence diagram illustrating an example of an operation of the authentication collaboration system according to the third embodiment.
Figure 24:
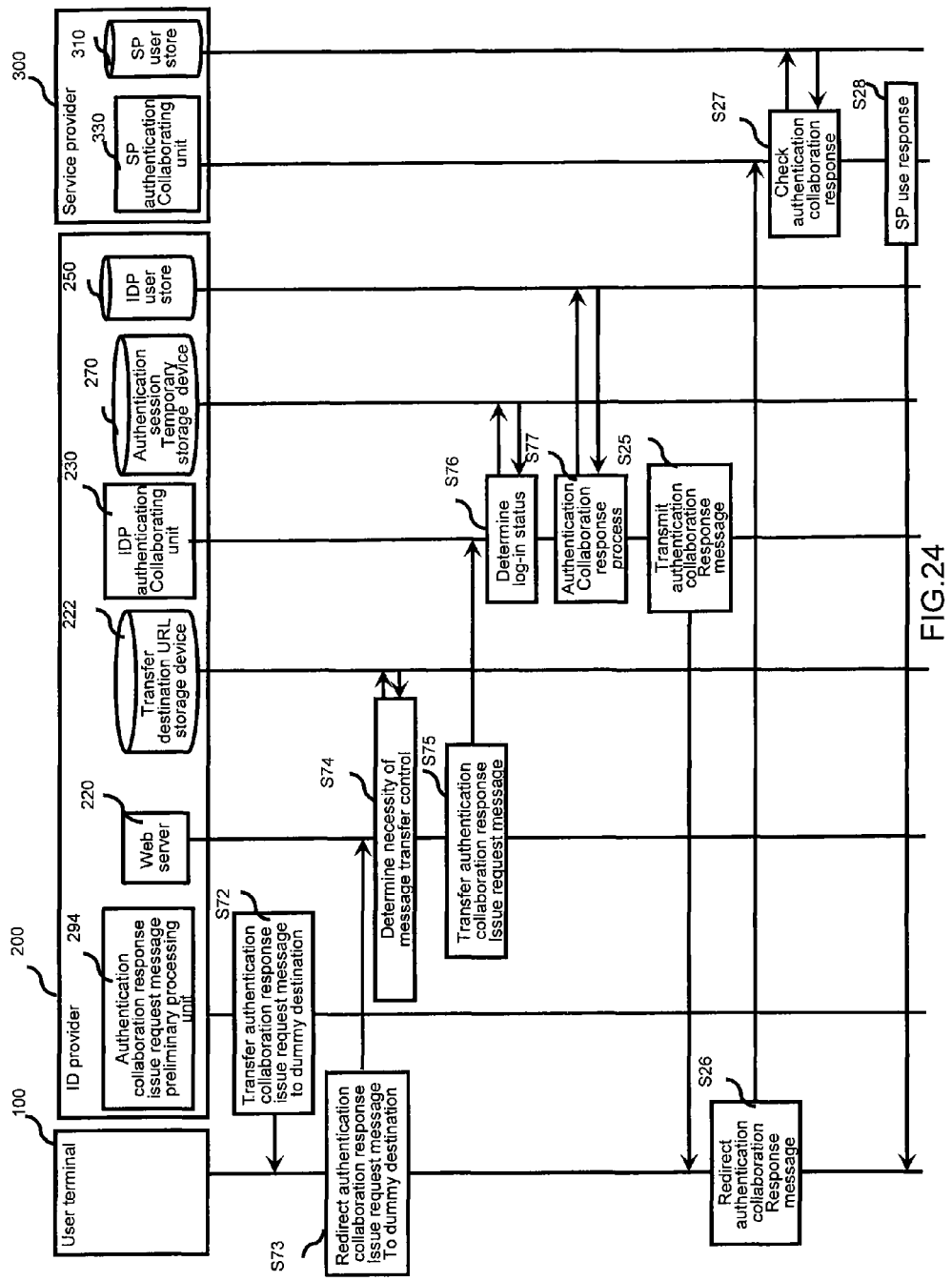
FIG. 24 is a sequence diagram illustrating an example of an operation of the authentication collaboration system according to the third embodiment.

Here, the authentication collaboration process of the authentication collaboration system according to the present embodiment will be described with reference to FIGS. 22 to 24. FIGS. 22 to 24 are sequence diagrams illustrating an example of the authentication collaboration process according to the present embodiment.

First, in step S61, in order to use the service of the service provider device 300, the user inputs an SP use request to the user terminal 100 by clicking a desired link among links of service open URLs provided by the service provider device 300 through a portal menu screen displayed on the user terminal 100 by the portal server 210.

In step S62, the user terminal 100 transmits the SP use request message to the portal server 210.

In step S63, the web server 220 receives the SP use request message transmitted from the user terminal 100, and performs a transfer necessity determining process of the received SP request message.

Specifically, the reverse proxy device 221 disposed in the web server 220 performs the transfer necessity determining process based on the transfer destination URL management table 223 stored in the transfer destination URL storage device 222. For example, an URL matching the destination of the received SP use request message is searched for in the Internet open URL field of the transfer destination URL management table 223 of FIG. 2. Here, the destination is the portal server 210 but there is no matching destination in the Internet open URL field of FIG. 2, and thus the reverse proxy device 221 determines that the transfer process is unnecessary.

In step S64, the reverse proxy device 221 transfers the SP use request message to the portal server 210 which is the original destination based on the determination result of step S63.

In step S65, the portal server 220 that has received the SP use request message generates the authentication collaboration response issue request message whose destination is the authentication collaboration response issue request message receiving unit 236 of the IDP authentication collaborating unit 230, and transmits the authentication collaboration response issue request message to the user terminal 100. In other words, the portal server 220 has an authentication collaboration response issue request function.

In step S66, the user terminal 100 that has received the authentication collaboration response issue request message redirects the authentication collaboration response issue request message to an authentication collaboration response issue request message receiving unit 294 which is a designated destination.

In step S67, the web server 220 receives the redirected authentication collaboration response issue request message, and performs the transfer necessity determining process of the received message.

The transfer necessity determining process is the same as the process of step S63. Here, since the destination matches ID "2-A" of the Internet open URL of the transfer destination URL management table 223 illustrated in FIG. 2, the reverse proxy device 221 determines that the transfer is necessary. Further, the transfer destination URL is the transfer destination URL of ID "2-B" corresponding to ID "2-A." In other words, the transfer destination URL is the authentication collaboration response issue request message preliminary processing unit 294 of the authentication collaboration control system 240.

In step S68, based on the determination result of step S67, the reverse proxy device 221 designates the authentication collaboration response issue request message preliminary processing unit 294 of the authentication collaboration control system 240 as the destination, and transfers the authentication collaboration response issue request message.

In step S69 of FIG. 23, the log-in status determining unit 242 of the authentication collaboration response issue request message preliminary processing unit 294 that has received the authentication collaboration response issue request message determines the log-in status of the user. The checking of the log-in status is performed by checking whether or not the IDP authentication token issued to the user remains stored in the authentication session temporary storage device 270. In the present embodiment, the IDP authentication token remains stored in the authentication session temporary storage device 270, and thus it is determined that the log-in status is the log-in completion status.

In step S70, the user ID acquiring unit 243 acquires the user ID associated with the IDP authentication token in step S69 from the authentication session temporary storage device 270.

In step S71, the authentication collaboration response issue request message preliminary processing unit 294 requests the policy evaluation information acquiring unit 245 to acquire the policy evaluation information. At this time, the user ID acquired in step S70 is also transferred to the policy evaluation information acquiring unit 245.

Subsequently to step S71, the service data acquisition process of step S11 of FIG. 14, the user attribute information acquisition process of step S12 of FIG. 14, the policy evaluation process of steps S13 to S15, and the account provisioning process of steps S16 to S18 are performed. The processes have been already described in the first embodiment, and thus will not be here described.

Next, the process of step S72 of FIG. 24 is performed. In step S72, after account provisioning of step S18 ends, the authentication collaboration response issue request message receiving unit 294 transmits the authentication collaboration response issue request message whose destination is the dummy URL to the user terminal 100. The dummy URL which is the transfer destination of the authentication collaboration response issue request message receiving unit 294 remains set in advance, and a "dummy (2) URL" is set as the dummy URL in the present embodiment.

In step S73, the user terminal 100 that has received the authentication collaboration response issue request message redirects the authentication collaboration response issue request message to the dummy (2) URL which is the destination of the authentication collaboration response issue request message.

In step S74, the reverse proxy device 221 performs the transfer necessity determining process of the authentication collaboration response issue request message redirected by the user terminal 100 based on the transfer destination URL management table 223 stored in the transfer destination URL storage device 223.

Here, ID "2-C" of the Internet open URL included in the transfer destination URL management table 223 is matched, it is determined that the message transfer control is necessary.

The transfer destination is the transfer destination URL corresponding to ID "2-C." In other words, the transfer destination is the authentication collaboration response issue request message receiving unit 236 of the IDP authentication collaborating unit 230 of ID "2-C."

In step S75, based on the determination result of step S74, the reverse proxy device 221 designates the authentication collaboration response issue request message receiving unit 236 of the IDP authentication collaborating unit 230 as the destination, and transfers the authentication collaboration response issue request message.

In step S76, when the authentication collaboration response issue request message is received, the authentication collaboration response issue request message receiving unit 236 of the IDP authentication collaborating unit 230 determines the log-in status of the user. For example, the log-in status determination result is obtained by checking whether or not the IDP authentication token issued to the user remains stored in the authentication session temporary storage device 270. In the present embodiment, since the log-in status is the log-in completion status, the IDP authentication token is present.

In step S77, since the determination result of the log-in status is the log-in completion status, the authentication collaboration response issue request message receiving unit 236 of the IDP authentication collaborating unit 230 requests the authentication collaboration response message transmitting unit 235 to transmit the authentication collaboration response message. The authentication collaboration response message transmitting unit 235 generates an authentication assertion verifying that the user has been authenticated by the IDP side.

Subsequently to the process of step S77, the process of steps S25 to S28 of FIG. 15 is performed, and then the authentication collaboration process according to the present embodiment ends. The process of steps S25 to S28 has been already described in the first embodiment and thus will not be here described.

As described above, according to the authentication collaboration system of the present embodiment, when the user belonging to the organization of the ID provider device 200 does not register an account to the service provider device 300, the log-in status of the user is the completion status, and the SSO request origination point from the user starts from the ID provider device 200, it is possible to determine whether or not the service can be used without requiring a manual operation when the account registration and collaboration are executed in the process of the SSO.

Further, according to the authentication collaboration system of the present embodiment, the authentication collaboration server 230 of the ID provider device 200 can insert the account provisioning process of performing policy evaluation and account registration/account collaboration immediately before the SSO procedure (3) while continuously performing the SSO procedures (2) to (4) without directly modifying the authentication collaboration server product of the ID provider device. Thus, it is possible to provide the authentication collaboration system in which the introduction cost is low and it can be determined whether or not the service can be used without a manual operation.

Further, according to the authentication collaboration system of the present embodiment, when the user belonging to the organization of the ID provider device 200 does not register an account to the service provider device 300, the log-in status of the user is the completion status, and the SSO request origination point from the user starts from the ID provider device 200, policy evaluation and account provisioning can be executed at an appropriate timing.

Fourth Embodiment

An authentication collaboration system according to a fourth embodiment will be described with reference to FIGS. 25 and 26.

In the present embodiment, similarly to the first embodiment, the process starts in a state in which the SSO process can be performed between the ID provider device 200 and the service provider device 300, and the user belonging to an organization of the ID provider side does not register an account to the service provider device 300. Further, in the authentication collaboration system of the present embodiment, the SSO is performed according to the above-described procedure of (1) to (6), similarly to the first embodiment.

Further, in the present embodiment, the log-in status of the user is assumed to the non-completion status, and the SSO request origination point from the user is assumed to start from the ID provider device 200.

Here, a functional configuration of the authentication collaboration system of the present embodiment will be described with reference to FIG. 25. The same components as in the first to third embodiments are denoted by the same reference numerals, and thus a description thereof will not be made.

Figure 25:
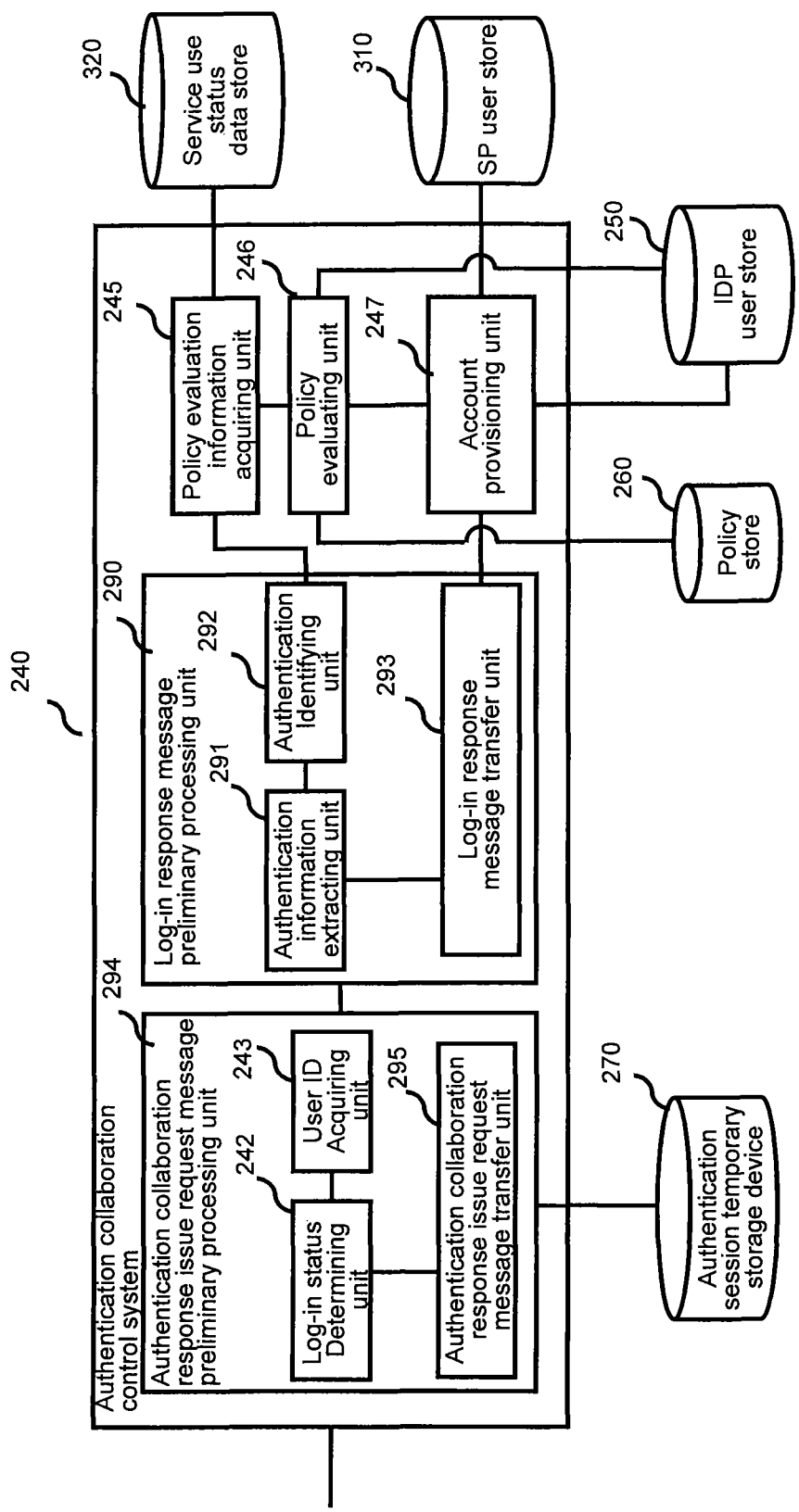
FIG. 25 is a block diagram illustrating an example of a functional configuration of an authentication collaboration system according to a fourth embodiment.
Figure 26:
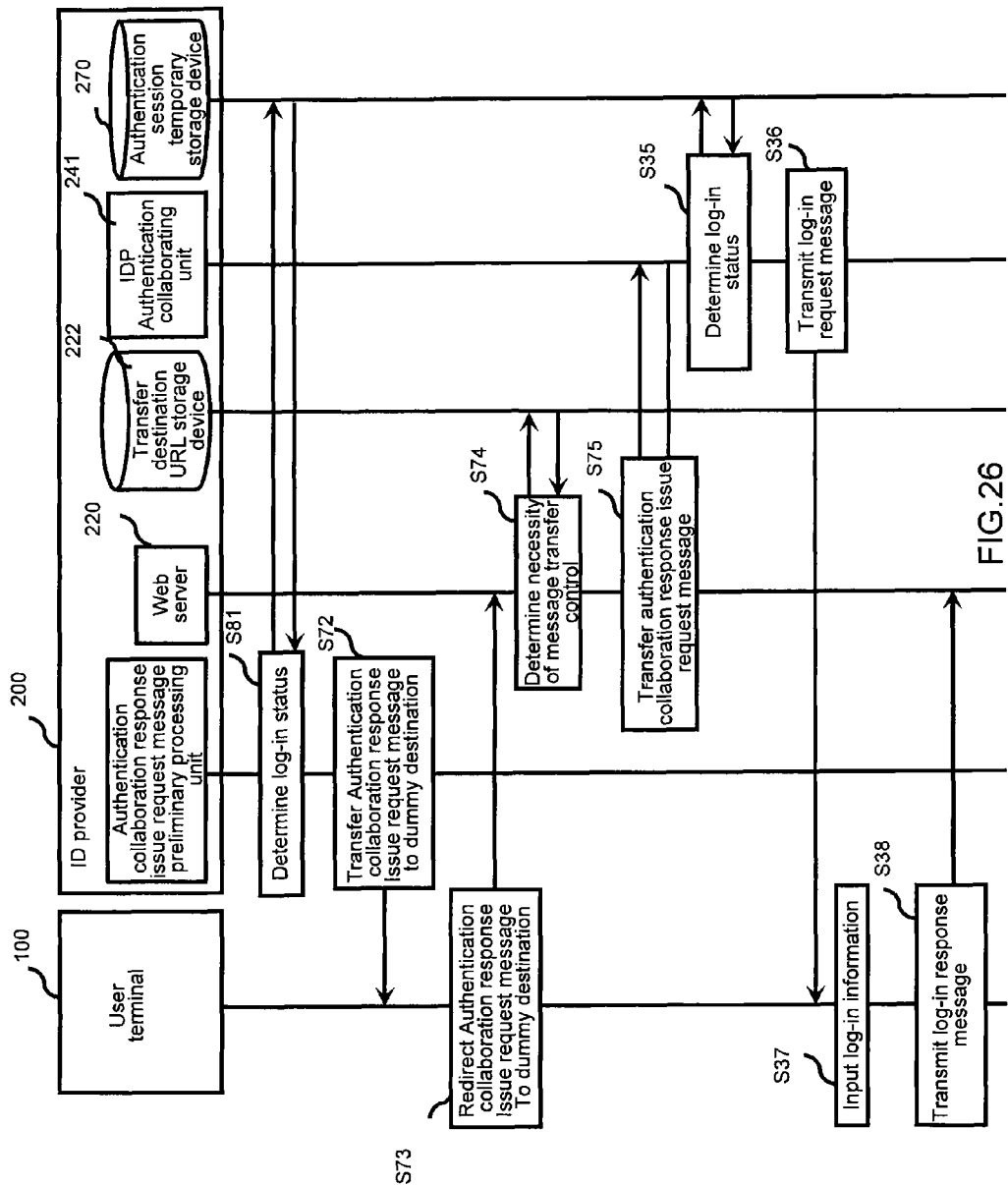
FIG. 26 is a sequence diagram illustrating an example of an operation of the authentication collaboration system according to the fourth embodiment.

FIG. 25 is a diagram illustrating an example of a functional configuration of the authentication collaboration control system 240 of the present embodiment. As illustrated in FIG. 25, the authentication collaboration control system 240 of the present embodiment includes a policy evaluation information acquiring unit 245, a policy evaluating unit 246, an account provisioning unit 247, a log-in response message preliminary processing unit 290, and an authentication collaboration response issue request message preliminary processing unit 294. In other words, the authentication collaboration control system 240 of the present embodiment is configured such that the authentication collaboration request message preliminary processing unit 241 of the authentication collaboration control system 240 according to the second embodiment is replaced with the authentication collaboration response issue request message preliminary processing unit 294 of the authentication collaboration control system 240 according to the third embodiment.

Here, an example of an authentication collaboration process in the authentication collaboration system of the present embodiment will be described with reference to FIGS. 22, 24, and 26. FIG. 26 is a sequence diagram illustrating an example of the authentication collaboration process according to the present embodiment.

First, the authentication collaboration system of the present embodiment performs the process from the SP use request of step S61 of FIG. 22 to the transfer of the authentication collaboration response issue request message of step S68. The processes have been already described in the third embodiment and thus will not be here described.

Subsequently to step S68, in step S81, the log-in status determining unit 242 of the authentication collaboration response issue request message preliminary processing unit 294 that has received the collaboration response issue request message determines the log-in status of the user. The checking of the log-in status is performed by checking whether or not the IDP authentication token issued to the user remains stored in the authentication session temporary storage device 270. In the present embodiment, the IDP authentication token does not remain stored in the authentication session temporary storage device 270, and thus it is determined that the log-in status is the log-in non-completion status.

Since it is determined in step S81 that the log-in status is the log-in non-completion status, the process of steps S72 to S75 illustrated in FIG. 24 is subsequently performed. This process has been also already described in the third embodiment and thus will not be here described.

Subsequently to step S75, the process from step S35 of FIG. 17 to step S28 of FIG. 19 is performed, and then the authentication collaboration process according to the present embodiment ends. The process from step S35 of FIG. 17 to step S28 of FIG. 19 has been already described in the second embodiment and thus will not be here described.

As described above, according to the authentication collaboration system of the present embodiment, when the user belonging to the organization of the ID provider device 200 does not register an account to the service provider device 300, the log-in status of the user is the non-completion status, and the SSO request origination point from the user starts from the ID provider device 200, it is possible to determine whether or not the service can be used without requiring a manual operation when the account registration and collaboration are executed in the process of the SSO.

Further, according to the authentication collaboration system of the present embodiment, when the user belonging to the organization of the ID provider device 200 does not register an account to the service provider device 300, the log-in status of the user is the non-completion status, and the SSO request origination from the user starts from the ID provider device 200, policy evaluation and account provisioning can be executed at an appropriate timing.

Further, according to the authentication collaboration system of the present embodiment, the authentication collaboration server 230 of the ID provider device 200 can insert the account provisioning process of performing policy evaluation and account registration/account collaboration immediately before the SSO procedure (3) while continuously performing the SSO procedures (2) to (4) without directly modifying the authentication collaboration server product of the ID provider device. Thus, it is possible to provide the authentication collaboration system in which the introduction cost is low and it can be determined whether or not the service can be used without a manual operation.

The exemplary embodiments of the present invention have been described above, but the above embodiments are merely examples, and do not intend to limit the scope of the invention. The novel embodiments can be implemented in various forms, and omissions, replacements, or changes can be made within the range not departing from the gist of the invention. The embodiments or the modifications thereof are included in the scope or the gist of the invention, and included in the range equivalent to the inventions set forth in claims.

REFERENCE SIGNS LIST

100: user terminal
200: ID provider
210: portal server
220: web server
221: reverse proxy device
222: transfer URL storage device
230: IDP authentication collaborating unit
240: authentication collaboration control system
250: IDP user store
260: policy store
270: authentication session temporary storage device
280: key storage device
290: log-in response message preliminary processing unit
300: service provider device
310: SP user store
320: service use status data store
330: temporary storage device
340: verification policy store
350: SP authentication collaborating unit

The invention claimed is:

1. An authentication collaboration system, comprising:
an ID provider device that performs a log-in process of a user terminal operated by a user; and
a service provider device that transmits service data to the user terminal when the log-in process is completed,
wherein the user terminal transmits a service use request to the service provider device,
the ID provider device includes
an IDP user attribute information storage unit that stores IDP user attribute information in which an item name of a user attribute including a user identifier identifying the user and specifying the user is associated with an item value of the user attribute,
an IDP authentication session storage unit that stores an ID of the user in association with an authentication token representing that the log-in status of the user is a log-in completion status,
a policy information storage unit that stores policy information representing a user of a target to whom transmission of the service data is permitted,
a key storage unit that stores a signature generation key of the ID provider device,
an IDP authentication collaborating unit that transmits a log-in request to the user terminal when a log-in process of the user terminal is in a non-completion status, receives an SP authentication collaboration request issued from the service provider device that has received the service use request when the log-in process of the user terminal is in a completion status, generates a digital signature on an assertion context including an authentication scheme name of the log-in process based on the signature generation key, generates an authentication assertion including the assertion context and the digital signature, and transmits an authentication collaboration response including the authentication assertion to the service provider device, and
an authentication collaboration control unit includes a log-in status determining unit that performs a log-in status checking process of checking whether or not an authentication token issued to the user remains stored in the authentication session storage unit when the SP authentication collaboration request is received from the user terminal, an authentication collaboration request transfer unit that transfers the SP authentication collaboration request to the IDP authentication collaborating unit when a result of the log-in status checking process is a log-in non-completion status, an authentication identifying unit that receives authentication information of the user transmitted based on the log-in request from the IDP authentication collaborating unit from the user terminal and performs the log-in process based on the received authentication information, a policy evaluating unit that evaluates whether or not a user operating the user terminal based on the IDP user attribute information acquired from the IDP user attribute information storage unit and the policy information is a user of a target to whom transmission of service data is permitted based on a user ID stored in the authentication session storage unit in association with the authentication token issued to the user when a result of the log-in status checking process is the log-in completion status, and evaluates whether or not a user operating the user terminal based on the IDP user attribute information acquired from the IDP user attribute information storage unit and the policy information is a user to whom transmission of service data is permitted based on a user ID included in the authentication information when a result of the log-in status checking process is the log-in non-completion, an account collaborating unit that performs an account collaboration process with the service provider device with reference to the acquired IDP user attribute information when an evaluation result by the policy evaluating unit is permission, and generates an SP side user ID which is an identifier of the user in the service provider device, and an authentication collaboration request transfer unit that transmits the SP authentication collaboration request to the IDP authentication collaborating unit after the account collaboration process, and the service provider device includes
a verification policy storage unit that stores verification policy including an authentication scheme name of the log-in process of permitting transmission of the service data when the authentication collaboration response is received and a signature verification key corresponding to the signature generation key,
an SP user attribute information storage unit that stores account registration in which the SP side user ID issued in the account collaboration process is associated with user attribute partial information which is at least one item name and one item value among item names and item values of a user attribute included in the user attribute information,
an SP authentication collaborating unit that determines whether or not the service use request includes the authentication token when the service use request is received, transmits the authentication token and the service data to the user terminal when it is determined that the service use request includes the authentication token, issues an SP authentication collaboration request including address information of the user terminal to the ID provider device when it is determined that the service use request does not include the authentication token, verifies the authentication scheme name and the digital signature based on the authentication scheme name and the signature verification key in the verification policy when the authentication collaboration response is received, and issues the authentication token and transmits the authentication token and the service data to the user terminal when the verification result is valid, and
an SP authentication session storage unit that stores the SP side user ID and the authentication token in association with each other.

2. An authentication collaboration system, comprising:
an ID provider device that performs a log-in process of a user terminal operated by a user; and
a service provider device that transmits service data to the user terminal when the log-in process is completed,
wherein the user terminal transmits a service use request to the ID provider device,
the ID provider device includes
an IDP user attribute information storage unit that stores IDP user attribute information in which an item name of a user attribute including a user identifier identifying the user and specifying the user is associated with an item value of the user attribute,
an IDP authentication session storage unit that stores an ID of the user in association with an authentication token representing that a log-in status of the user is a log-in completion status,
a policy information storage unit that stores policy information representing a user of a target to whom transmission of the service data is permitted,
a key storage unit that stores a signature generation key of the ID provider device,
an IDP authentication collaboration requesting unit that issues an IDP authentication collaboration request to the service provider device when a service use request is received from the user terminal,
an IDP authentication collaborating unit that transmits a log-in request to the user terminal when a log-in process of the user terminal is in a non-completion status, receives the IDP authentication collaboration request when the log-in process of the user terminal is in a completion status, generates a digital signature on an assertion context including an authentication scheme name of the log-in process based on the signature generation key, generates an authentication assertion including the assertion context and the digital signature, and transmits an authentication collaboration response including the authentication assertion to the service provider device, and
an authentication collaboration control unit includes a log-in status determining unit that performs a log-in status checking process of checking whether or not an authentication token issued to the user remains stored in the authentication session storage unit when the IDP authentication collaboration request is received, an authentication collaboration request transfer unit that transfers the IDP authentication collaboration request to the IDP authentication collaborating unit when a result of the log-in status checking process is a log-in non-completion status, an authentication identifying unit that receives authentication information of the user transmitted based on the log-in request from the IDP authentication collaborating unit from the user terminal and performs the log-in process based on the received authentication information, a policy evaluating unit that evaluates whether or not a user operating the user terminal based on the IDP user attribute information acquired from the IDP user attribute information storage unit and the policy information is a user of a target to whom transmission of service data is permitted based on a user ID stored in the authentication session storage unit in association with the authentication token issued to the user when a result of the log-in status checking process is the log-in completion status, and evaluates whether or not a user operating the user terminal based on the IDP user attribute information acquired from the IDP user attribute information storage unit and the policy information is a user of a target to whom transmission of service data is permitted based on a user ID included in the authentication information when a result of the log-in status checking process is the log-in non-completion status, an account collaborating unit that performs an account collaboration process with the service provider device with reference to the acquired IDP user attribute information when an evaluation result by the policy evaluating unit is permission, and generates an SP side user ID which is an identifier of the user in the service provider device, and an authentication collaboration request transfer unit that transmits the IDP authentication collaboration request to the IDP authentication collaborating unit after the account collaboration process, and
the service provider device includes
a verification policy storage unit that stores verification policy including an authentication scheme name of the log-in process of permitting transmission of the service data when the authentication collaboration response is received and a signature verification key corresponding to the signature generation key,
an SP user attribute information storage unit that stores account registration in which the SP side user ID issued in the account collaboration process is associated with user attribute partial information which is at least one item name and one item value among item names and item values of a user attribute included in the user attribute information,
an SP authentication collaborating unit that verifies the authentication scheme name and the digital signature based on the authentication scheme name and the signature verification key in the verification policy when the authentication collaboration response is received from the IDP authentication collaborating unit, and issues the authentication token and transmits the authentication token and the service data to the user terminal when the verification result is valid, and an SP authentication session storage unit that stores the SP side user ID and the authentication token in association with each other.

3. An ID provider device that is connected with a service provider device transmitting service data to a user terminal operated by a user to configure an authentication collaboration system, and performs a log-in process of the user terminal transmitting a service use request to the service provider device, the ID provider device comprising:

an IDP user attribute information storage unit that stores IDP user attribute information in which an item name of a user attribute including a user identifier identifying the user and specifying the user is associated with an item value of the user attribute;

an IDP authentication session storage unit that stores an ID of the user in association with an authentication token representing that a log-in status of the user is a log-in completion status;

a policy information storage unit that stores policy information representing a user of a target to whom transmission of the service data is permitted;

a key storage unit that stores a signature generation key of the ID provider device;

an IDP authentication collaborating unit that transmits a log-in request to the user terminal when a log-in process of the user terminal is in a non-completion status, receives an SP authentication collaboration request issued from the service provider device that has received the service use request when the log-in process of the user terminal is in a completion status, generates a digital signature on an assertion context including an authentication scheme name of the log-in process based on the signature generation key, generates an authentication assertion including the assertion context and the digital signature, and transmits an authentication collaboration response including the authentication assertion to the service provider device;

an authentication collaboration control unit includes a log-in status determining unit that performs a log-in status checking process of checking whether or not an authentication token issued to the user remains stored in the authentication session storage unit when the SP authentication collaboration request is received from the user terminal, an authentication collaboration request transfer unit that transfers the SP authentication collaboration request to the IDP authentication collaborating unit when a result of the log-in status checking process is a log-in non-completion status, an authentication identifying unit that receives authentication information of the user transmitted based on the log-in request from the IDP authentication collaborating unit from the user terminal and performs the log-in process based on the received authentication information, a policy evaluating unit that evaluates whether or not a user operating the user terminal based on the IDP user attribute information acquired from the IDP user attribute information storage unit and the policy information is a user to whom transmission of service data is permitted based on a user ID stored in the authentication session storage unit in association with the authentication token issued to the user when a result of the log-in status checking process is the log-in completion status, and evaluates whether or not a user operating the user terminal based on the IDP user attribute information acquired from the IDP user attribute information storage unit and the policy information is a user of a target to whom transmission of service data is permitted based on a user ID included in the authentication information when a result of the log-in status checking process is the log-in non-completion status, an account collaborating unit that performs an account collaboration process with the service provider device with reference to the acquired IDP user attribute information when an evaluation result by the policy evaluating unit is permission, and generates an SP side user ID which is an identifier of the user in the service provider device, and an authentication collaboration request transfer unit that transmits the SP authentication collaboration request to the IDP authentication collaborating unit after the account collaboration process; and a transfer device that transfers the authentication collaboration request transmitted from the service provider device to the authentication collaboration control unit.

4. An ID provider device that is connected with a service provider device transmitting service data to a user terminal operated by a user to configure an authentication collaboration system, and performs a log-in process of the user terminal, the ID provider device comprising:

an IDP user attribute information storage unit that stores IDP user attribute information in which an item name of a user attribute including a user identifier identifying the user and specifying the user is associated with an item value of the user attribute;

an IDP authentication session storage unit that stores an ID of the user in association with an authentication token representing that a log-in status of the user is a log-in completion status;

a policy information storage unit that stores policy information representing a user of a target to whom transmission of the service data is permitted;

a key storage unit that stores a signature generation key of the ID provider device;

an IDP authentication collaboration requesting unit that issues an IDP authentication collaboration request to the service provider device when a service use request is received from the user terminal;

an IDP authentication collaborating unit that transmits a log-in request to the user terminal when a log-in process of the user terminal is in a non-completion status, receives the IDP authentication collaboration request when the log-in process of the user terminal is in a completion status, generates a digital signature on an assertion context including an authentication scheme name of the log-in process based on the signature generation key, generates an authentication assertion including the assertion context and the digital signature, and transmits an authentication collaboration response including the authentication assertion to the service provider device; and an authentication collaboration control unit includes a log-in status determining unit that performs a log-in status checking process of checking whether or not an authentication token issued to the user remains stored in the authentication session storage unit when the IDP authentication collaboration request is received, an authentication collaboration request transfer unit that transfers the IDP authentication collaboration request to the IDP authentication collaborating unit when a result of the log-in status checking process is a log-in non-completion status, an authentication identifying unit that receives authentication information of the user transmitted based on the log-in request from the IDP authentication collaborating unit from the user terminal and performs the log-in process based on the received authentication information, a policy evaluating unit that evaluates whether or not a user operating the user terminal based on the IDP user attribute information acquired from the IDP user attribute information storage unit and the policy information is a user of a target to whom transmission of service data is permitted based on a user ID stored in the authentication session storage unit in association with the authentication token issued to the user when a result of the log-in status checking process is the log-in completion status, and evaluates whether or not a user operating the user terminal based on the IDP user attribute information acquired from the IDP user attribute information storage unit and the policy information is a user to whom transmission of service data is permitted based on a user ID included in the authentication information when a result of the log-in status checking process is the log-in non-completion status, an account collaborating unit that performs an account collaboration process with the service provider device with reference to the acquired IDP user attribute information when an evaluation result by the policy evaluating unit is permission, and generates an SP side user ID which is an identifier of the user in the service provider device, and an authentication collaboration request transfer unit that transmits the IDP authentication collaboration request to the IDP authentication collaborating unit after the account collaboration process.

5. The ID provider device according to claim 3, further comprising,
a service use status storage unit that stores service use status information in which the user ID is associated with a service use status of each service provider device,
wherein an authentication collaboration request preliminary processing unit evaluates whether or not the user operating the user terminal is a user to whom transmission of service data is permitted with reference to the service use status information stored in the service use status storage unit and the policy information stored in the policy information storage unit.

* * * * *